United States Patent
Jiang et al.

(10) Patent No.: US 12,367,712 B2
(45) Date of Patent: Jul. 22, 2025

(54) ACTION RECOGNITION METHOD, APPARATUS AND DEVICE, STORAGE MEDIUM AND COMPUTER PROGRAM PRODUCT

(71) Applicant: Tencent Technology (Shenzhen) Company Limited, Guangdong (CN)

(72) Inventors: Boyuan Jiang, Guangdong (CN); Donghao Luo, Guangdong (CN); Mingyu Wu, Guangdong (CN); Yabiao Wang, Guangdong (CN); Chengjie Wang, Guangdong (CN); Xiaoming Huang, Guangdong (CN); Jilin Li, Guangdong (CN); Feiyue Huang, Guangdong (CN); Yongjian Wu, Guangdong (CN)

(73) Assignee: Tencent Technology (Shenzhen) Company Limited (CN)

( * ) Notice: Subject to any disclaimer, the term of this patent is extended or adjusted under 35 U.S.C. 154(b) by 348 days.

(21) Appl. No.: 17/977,415

(22) Filed: Oct. 31, 2022

(65) Prior Publication Data

US 2023/0067934 A1     Mar. 2, 2023

Related U.S. Application Data

(63) Continuation of application No. PCT/CN2022/073411, filed on Jan. 24, 2022.

(30) Foreign Application Priority Data

Jan. 29, 2021 (CN) .......................... 202110134629.5

(51) Int. Cl.
*G06V 40/20* (2022.01)
*G06V 10/56* (2022.01)
(Continued)

(52) U.S. Cl.
CPC .............. *G06V 40/20* (2022.01); *G06V 10/56* (2022.01); *G06V 10/757* (2022.01);
(Continued)

(58) Field of Classification Search
CPC ...... G06V 40/20; G06V 10/56; G06V 10/757; G06V 10/761; G06V 10/806; G06V 20/46;
(Continued)

(56) References Cited

U.S. PATENT DOCUMENTS

2019/0019037 A1    1/2019 Kadav et al.
2019/0147227 A1*   5/2019 Ko .......................... G06N 3/08
                                                        382/118

FOREIGN PATENT DOCUMENTS

CN    110059662 A  *  7/2019
CN    110766724 A     2/2020
(Continued)

OTHER PUBLICATIONS

International Search Report (PCT/ISA/210) issued in PCT Application No. PCT/CN2022/073411 dated Apr. 26, 2022 with English translation (five (5) pages).
(Continued)

*Primary Examiner* — John Villecco
*Assistant Examiner* — Kyla Guan-Ping Tiao Allen
(74) *Attorney, Agent, or Firm* — Crowell & Moring LLP

(57) ABSTRACT

The present subject matter discloses an action recognition method, apparatus and device, a storage medium, and a computer program product, belonging to the field of image recognition. Multiple video frames in a target video are obtained. Feature extraction is performed on the multiple video frames respectively according to multiple dimensions to obtain multiple multi-channel feature patterns. Each video frame corresponds to one multi-channel feature pattern.
(Continued)

Each channel represents one dimension. An attention weight of each multi-channel feature pattern is determined based on a similarity between every two multi-channel feature patterns. The attention weight is used for representing a degree of correlation between a corresponding multi-channel feature pattern and an action performed by an object in the target video. A type of the action is determined based on the multiple multi-channel feature patterns and the determined multiple attention weights.

19 Claims, 10 Drawing Sheets

(51) Int. Cl.
*G06V 10/74* (2022.01)
*G06V 10/75* (2022.01)
*G06V 10/80* (2022.01)
*G06V 20/40* (2022.01)

(52) U.S. Cl.
CPC .......... *G06V 10/761* (2022.01); *G06V 10/806* (2022.01); *G06V 20/46* (2022.01); *G06V 20/48* (2022.01)

(58) Field of Classification Search
CPC ...... G06V 10/82; G06V 20/41; G06V 10/764; G06N 3/045
See application file for complete search history.

(56) References Cited

FOREIGN PATENT DOCUMENTS

| CN | 111091576 A | * | 5/2020 |
|----|----|----|----|
| CN | 111489378 A | | 8/2020 |
| CN | 111489378 B | | 10/2020 |
| CN | 112131943 A | | 12/2020 |

OTHER PUBLICATIONS

Chinese-language Written Opinion (PCT/ISA/237) issued in PCT Application No. PCT/CN2022/073411 dated Apr. 26, 2022 (three (3) pages).

* cited by examiner

ACTION RECOGNITION METHOD, APPARATUS AND DEVICE, STORAGE MEDIUM AND COMPUTER PROGRAM PRODUCT

RELATED APPLICATION

This application is a continuation of PCT application PCT/CN2022/073411 filed Jan. 24, 2022, which claims priority to Chinese Patent Application No. 202110134629.5, entitled "ACTION RECOGNITION METHOD, APPARATUS AND DEVICE, STORAGE MEDIUM AND COMPUTER PROGRAM PRODUCT" filed with the China National Intellectual Property Administration on Jan. 29, 2021, which is incorporated herein by reference in its entirety.

FIELD OF THE TECHNOLOGY

The present subject matter relates to the field of image recognition, and in particular relates to an action recognition method, apparatus and device, a storage medium, and a computer program product.

BACKGROUND

With the development of the computer technology, more and more scenes require action recognition, such as recognition of actions performed by characters in surveillance videos, or recognition of actions performed by actors in movie videos.

In the related art, a video is often divided into multiple video frames, the multiple video frames are respectively input into an image recognition model, and the image recognition model performs action recognition independently based on each video frame and finally fuses action recognition results of the multiple video frames as an action recognition result of the video.

However, since the actions in the video are often continuous, when the actions in the video are predicted based on individual video frames, the continuity of the actions may be split, resulting in low accuracy of action recognition.

BRIEF SUMMARY

The examples of the present subject matter provide an action recognition method, apparatus and device, a storage medium, and a computer program product. The technical solutions are as follows.

An action recognition method may be performed by a computer device, and the method includes: obtaining multiple video frames in a target video; performing feature extraction on the multiple video frames respectively according to multiple dimensions to obtain multiple multi-channel feature patterns, each video frame corresponding to one multi-channel feature pattern, and each channel representing one dimension; determining a first attention weight of each multi-channel feature pattern based on a similarity between every two multi-channel feature patterns in the multiple multi-channel feature patterns, the first attention weight being used for representing the degree of correlation between a corresponding multi-channel feature pattern and an action performed by an object in the target video; and determining a type of the action based on the multiple multi-channel feature patterns and the determined multiple first attention weights.

An action recognition method may be performed by a computer device, and the method includes: obtaining multiple video frames in a target video; performing feature extraction on the multiple video frames respectively according to multiple dimensions to obtain multiple multi-channel feature patterns, each video frame corresponding to one multi-channel feature pattern, and each channel representing one dimension; determining a third attention weight of each feature point based on a similarity between multiple feature points on multi-channel feature patterns of every two adjacent video frames, the third attention weight being used for representing the degree of correlation between a corresponding feature point and an action performed by an object in the target video; and determining a type of the action based on the multiple multi-channel feature patterns and the determined multiple third attention weights.

An action recognition apparatus includes: a first obtaining unit configured to obtain multiple video frames in a target video; a first feature extraction unit configured to perform feature extraction on the multiple video frames respectively according to multiple dimensions to obtain multiple multi-channel feature patterns, each video frame corresponding to one multi-channel feature pattern, and each channel representing one dimension; a first attention weight determining unit configured to determine a first attention weight of each multi-channel feature pattern based on a similarity between every two multi-channel feature patterns in the multiple multi-channel feature patterns, the first attention weight being used for representing the degree of correlation between a corresponding multi-channel feature pattern and an action performed by an object in the target video; and a first type determining unit configured to determine a type of the action based on the multiple multi-channel feature patterns and the determined multiple first attention weights.

An action recognition apparatus includes: a second obtaining unit configured to obtain multiple video frames in a target video; a second feature extraction unit configured to perform feature extraction on the multiple video frames respectively according to multiple dimensions to obtain multiple multi-channel feature patterns, each video frame corresponding to one multi-channel feature pattern, and each channel representing one dimension; a third attention weight determining unit configured to determine a third attention weight of each feature point based on a similarity between multiple feature points on multi-channel feature patterns of every two adjacent video frames, the third attention weight being used for representing the degree of correlation between a corresponding feature point and an action performed by an object in the target video; and a second type determining unit configured to determine a type of the action based on the multiple multi-channel feature patterns and the determined multiple third attention weights.

A computer device may be provided, including a memory and one or more processors, the memory storing computer-readable instructions, and the computer-readable instructions, when executed by the one or more processors, causing the one or more processors to perform the operations of the action recognition method.

One or more non-transitory, non-volatile computer-readable storage media storing computer-readable instructions are provided, the computer-readable instructions, when executed by one or more processors, causing the one or more processors to perform the operations of the action recognition method.

A computer program product or a computer program may be provided, including computer-readable instructions, the computer-readable instructions being stored in a non-transitory computer-readable storage medium, a processor of a computer device reading the computer-readable instructions from the computer-readable storage medium, and the processor executing the computer-readable instructions to cause the computer device to perform the operations of the action recognition method.

Details of one or more examples of the present subject matter are provided in the accompanying drawings and descriptions below. Other features, objectives, and advantages of the present subject matter become apparent from the specification, the drawings, and the claims.

BRIEF DESCRIPTION OF THE DRAWINGS

To describe the technical solutions in the examples of the present subject matter more clearly, the following briefly describes the accompanying drawings required for describing the examples. Apparently, the accompanying drawings in the following description show only some examples of the present subject matter, and a person of ordinary skill in the art may still derive other accompanying drawings according to the accompanying drawings without creative efforts.

DETAILED DESCRIPTION

To make objectives, technical solutions, and advantages of the present subject matter clearer, the following further describes implementations of the present subject matter in detail with reference to the accompanying drawings.

As used herein, the terms "first", "second", and the like distinguish between same items or similar items of which effects and functions are basically the same. It should be understood that, the "first", "second", and "nth" do not have a dependency relationship in logic or time sequence, and a quantity and an execution order thereof may not be limited.

As used herein, "at least one" means one or more, and "a plurality of" means two or more. For example, a plurality of reference face images mean two or more reference face images.

The AI technology is a comprehensive discipline, and relates to a wide range of fields including both hardware-level technologies and software-level technologies. AI software technologies mainly include several major directions such as a computer vision (CV) technology, a speech processing technology, a natural language processing technology, and machine learning/deep learning.

Normalization processing: number sequences with different value ranges are mapped to the (0, 1) interval to facilitate data processing. In some cases, normalized values may be directly implemented as probabilities.

Attention mechanism: in a hidden layer of a neural network, the attention mechanism adjusts a direction of attention and a weighting model according to a specific task object. By increasing the weight of the attention mechanism, the content that does not conform to an attention model may be weakened or forgotten. If the direction of attention may be based on itself, it may be called the self-attention mechanism.

Attention weight it may represent the importance of certain data in a training or prediction process, and the importance represents the influence of inputted data on outputted data. The data with high importance has a higher value of the corresponding attention weight, and the data with low importance has a lower value of the corresponding attention weight. In different scenes, the importance of data may be different, and a process of training attention weights of a model may be also a process of determining the importance of data.

Convolutional neural network (CNN) it is a feedforward neural network of which the neurons may respond to units within the receptive field. The CNN may usually be formed by a plurality of convolution layers and a fully connected layer at the top. The CNN may be widely applied to image recognition and speech recognition by reducing a quantity of parameters of a model by sharing parameters.

Figure 1:
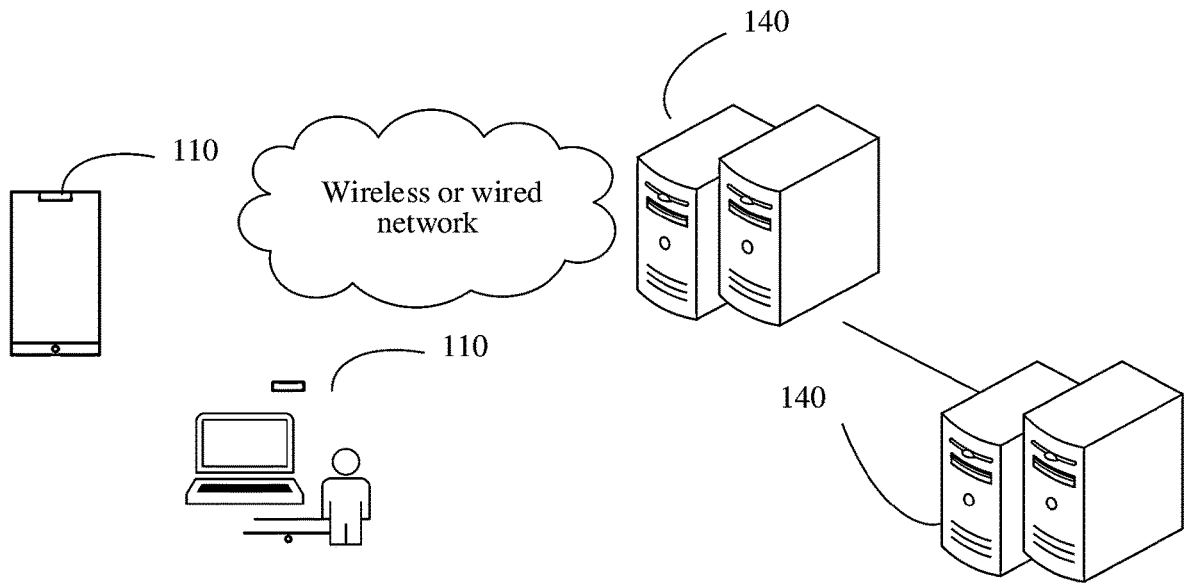
FIG. 1 may be a schematic diagram of an implementation environment of an action recognition method provided by an example of the present subject matter.

FIG. 1 is a schematic diagram of an implementation environment of an action recognition method according to an example of the present subject matter. Referring to FIG. 1, the implementation environment may include a terminal 110 and a server 140.

The terminal 110 may be connected to the server 140 by using a wireless network or a wired network. In some examples, the terminal 110 may be, but may not be limited to, various personal computers, smart phones, tablet computers, notebook computers, desktop computers, Internet of things (IoT) devices, and portable wearable devices. The IoT devices may be smart speakers, smart televisions, smart air conditioners, smart vehicle-mounted devices, etc. The portable wearable devices may be smart watches, smart bracelets, head-mounted devices, etc., but may not be limited thereto. An application program that supports action recognition may be installed and run on the terminal 110.

In some examples, the server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In some examples, the terminal 110 generally refers to one of a plurality of terminals. In this example of the present subject matter, the terminal 110 may be merely used as an example for description.

A person skilled in the art may learn that there may be more or fewer terminals. For example, there may be only one terminal, or there may be dozens of or hundreds of or more terminals. In this case, the application environment further includes another terminal. The quantity and the device type of the terminals may not be limited in the examples of the present subject matter.

After the implementation environments of the technical solutions provided by the examples of the present subject matter are introduced, application scenes of the present subject matter are introduced below.

The technical solutions provided by the examples of the present subject matter may be applied to scenes, such as action analysis of an object in a video, video classification and security video anomaly analysis, which may not be limited in the examples of the present subject matter. The following will take the above three application scenes as examples for description.

1. In a scene of action analysis of an object in a video, a computer device may perform the technical solutions provided by the examples of the present subject matter on the video, so as to recognize a type of an action performed by the object in the video. For example, if the video may be a dancing video of a dancer, the computer device may perform the technical solutions provided by the examples of the present subject matter on the video, to recognize a dancing type of the dancer. In some examples, if the video may be a live video, the computer device may perform the technical solutions provided by the examples of the present subject matter on the live video, to obtain a type of an action performed by a host in the live video. The computer device may add tags to the live video based on the type of the action, so that viewers of the live video may know the content of the live video in advance.
2. In a scene of video classification, the computer device may perform the technical solutions provided by the examples of the present subject matter on multiple videos so as to recognize types of actions performed by objects in the multiple videos, and classify the multiple videos based on the types of the actions performed by the objects in the videos so as to classify the videos with the same type of the actions performed by the objects as the same type. For example, the computer device may respectively add video tags to multiple videos based on types of actions performed by objects in the multiple videos, and classify the multiple videos based on the video tags so as to divide the multiple videos into multiple types to facilitate subsequent query and storage.
3. In a scene of security video anomaly analysis, the computer device may perform the technical solutions provided by the examples of the present subject matter on a security video, so as to recognize a type of an action performed by an object in the security video. On the basis of recognizing the type of the action, the computer device may mark the type of the performed action as an object of a target action type, so as to facilitate the security personnel to lock the object in time, where the target action type includes at least one of actions of jumping over a wall, breaking a gate, swinging a knife, entering a vehicle, etc., which may not be limited in the examples of the present subject matter.

According to the above action recognition method, in a process of performing action recognition on a target video, the similarity between multiple video frames in the target video may be combined, and since the change of the action will cause the change of the similarity between the video frames, the similarity may reflect the continuity of the action. The attention weights obtained based on the similarity may represent the degree of correlation between the feature patterns and the action, and action recognition may be performed based on the attention weights and multi-channel feature patterns, so that the accuracy of action recognition may be improved.

In the above description process, the above three application scenes are taken as examples for description. In other possible cases, the technical solutions provided by the examples of the present subject matter may be further applied to action recognition processes of other types of videos, which may not be limited in the examples of the present subject matter.

In the following process of describing the technical solutions provided by the examples of the present subject matter, a computer device may be used as a terminal for description. In other possible implementations, the process may be performed by a server as an execution body or by the cooperation between a terminal and a server. The type of the execution body may not be limited in the examples of the present subject matter.

Figure 2:
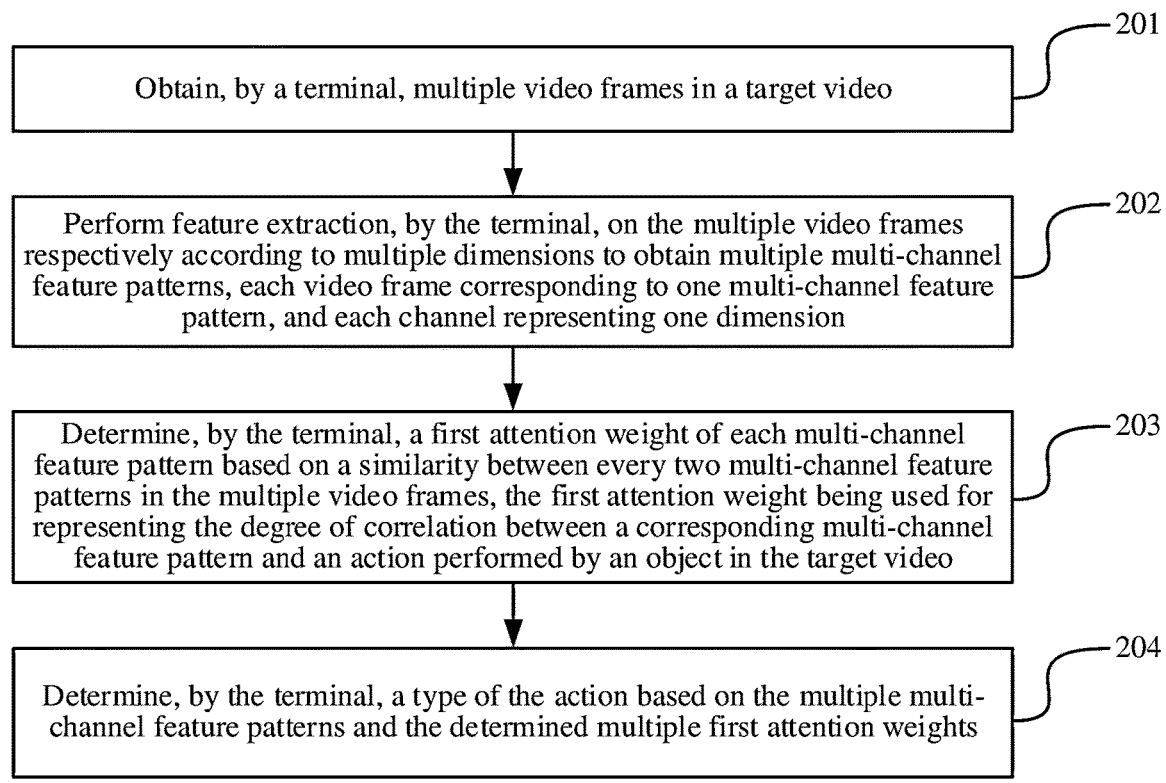
FIG. 2 is a flowchart of an action recognition method provided by an example of the present subject matter.

FIG. 2 is a flowchart of an action recognition method provided by an example of the present subject matter. Referring to FIG. 2, the method includes:

201: Obtain, by a terminal, multiple video frames in a target video.

The target video may be any one of the videos in the above application scenes, which may not be limited in the example of the present subject matter. The multiple video frames in the target video may be obtained by dividing the target video into frames, and the frame dividing process may be implemented in the terminal or in other computer devices. For example, the terminal may obtain a target video and divides the target video into frames to obtain multiple video frames in the target video. The terminal may further obtain multiple video frames directly from other computer devices after the computer devices divide a target video into frames.

202: Perform feature extraction, by the terminal, on the multiple video frames respectively according to multiple dimensions to obtain multiple multi-channel feature patterns, each video frame corresponding to one multi-channel feature pattern, and each channel representing one dimension.

Dimensions are different aspects of a video frame. For example, if one dimension may be a background of the video frame, the features extracted in this dimension may represent the background of the video frame; and if another dimension may be a color of the video frame, the features extracted in this dimension may represent the color of the video frame. The terminal performs multi-dimension feature extraction on the video frame, that is, performs feature extraction on the video frame from multiple aspects, and obtained multi-channel feature patterns may comprehensively express the features of the video frame from multiple aspects.

203: Determine, by the terminal, a first attention weight of each multi-channel feature pattern based on a similarity between every two multi-channel feature patterns in the multiple video frames, the first attention weight being used for representing the degree of correlation between a corresponding multi-channel feature pattern and an action performed by an object in the target video.

If there may be a moving object in the target video, the position of the object may be different in different video frames of the target video. As shown in the multi-channel feature patterns of the video frames, if a similarity between two multi-channel feature patterns may be higher, the object may not move or the magnitude of the motion may be smaller in the video frames corresponding to the two multi-channel feature patterns; and if a similarity between two multi-channel feature patterns may be lower, the object may move in the video frames corresponding to the two multi-channel feature patterns. The terminal may use the first attention weights for representing the degree of correlation between the multi-channel feature patterns and the motion, so that in the subsequent action recognition process, the terminal may focus on the multi-channel feature patterns with a higher degree of action correlation for recognition.

204: Determine, by the terminal, a type of the action based on the multiple multi-channel feature patterns and the determined multiple first attention weights.

The terminal may enhance the motion-related multi-channel feature patterns based on the first attention weights, so as to improve the accuracy of action recognition.

According to the technical solution provided by this example of the present subject matter, in a process of performing action recognition on a target video, the similarity between multiple video frames in the target video may be combined, and since the change of the action will cause the change of the similarity between the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

Figure 3:
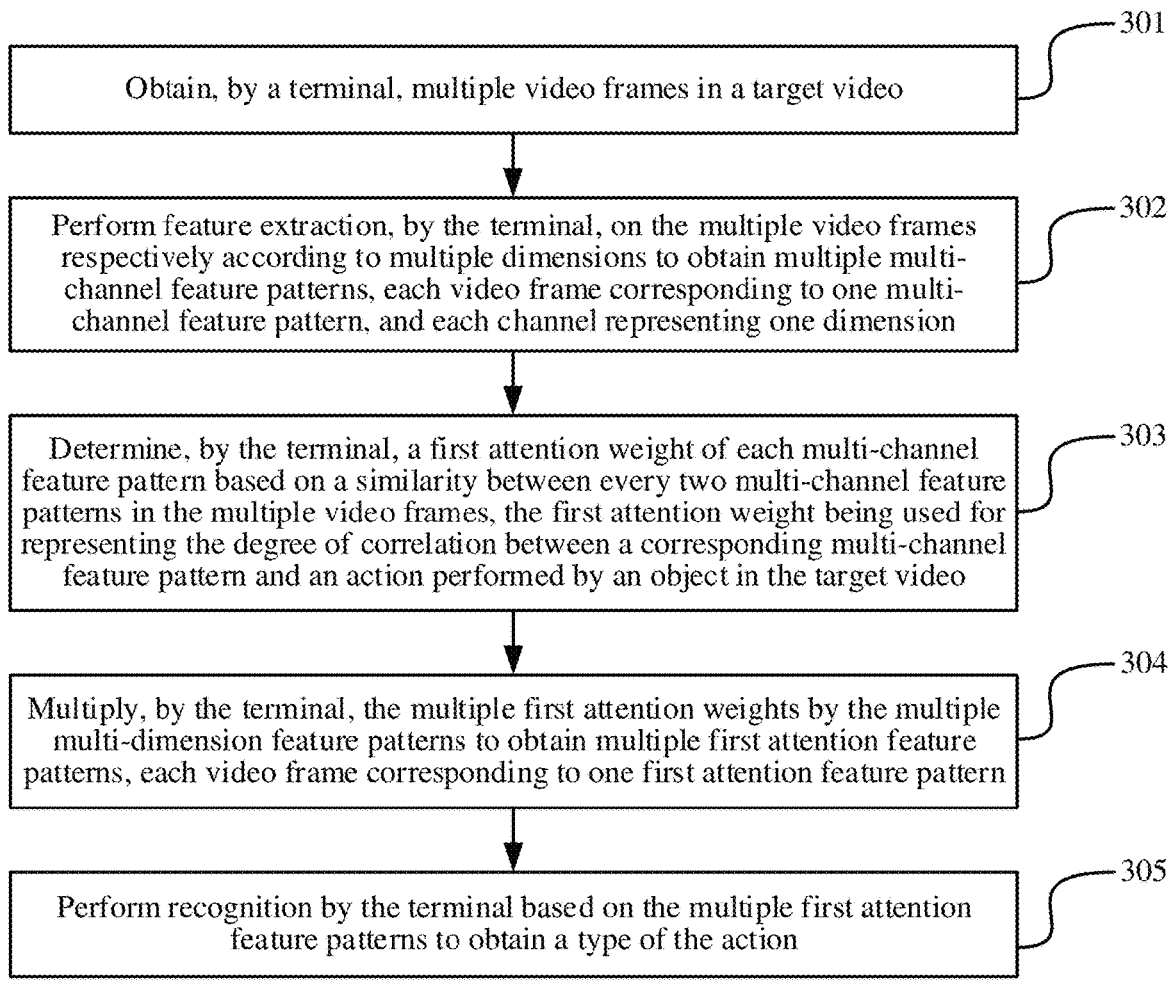
FIG. 3 is a flowchart of an action recognition method provided by another example of the present subject matter.

The above steps 201 to 204 are brief descriptions of the example of the present subject matter. The technical solutions provided by the examples of the present subject matter will be described in detail below with reference to some examples. FIG. 3 is a flowchart of an action recognition method provided by an example of the present subject matter. Referring to FIG. 3, the method includes:

301: Obtain, by a terminal, multiple video frames in a target video.

In a possible implementation, the terminal may obtain all video frames in the target video. In this implementation, the terminal may perform action recognition based on all video frames of the target video. Since all video frames carry all the information of the target video, the result of subsequent action recognition based on all video frames may be more accurate.

In a possible implementation, the terminal may perform interval sampling on the target video to obtain multiple video frames, that is, perform sampling at intervals of N video frames from the target video to obtain multiple video frames, where N may be a positive integer greater than or equal to 1.

In this implementation, the terminal does not need to obtain all video frames in the target video, but obtains video frames from the target video through interval sampling, so that the number of video frames may be reduced to improve the efficiency of action recognition.

For example, if there are 100 video frames in the target video, the terminal may perform sampling at an interval of every 2 video frames, that is, the terminal obtains a first video frame, a fourth video frame, a seventh video frame, and so on, from the target video to obtain multiple video frames.

302: Perform feature extraction, by the terminal, on the multiple video frames respectively according to multiple dimensions to obtain multiple multi-channel feature patterns, each video frame corresponding to one multi-channel feature pattern, and each channel representing one dimension.

In a possible implementation, for any one of the video frames, the terminal uses multiple convolution kernels to perform feature extraction on the video frame to obtain multiple single-channel feature patterns corresponding to the multiple convolution kernels, and each convolution kernel may be used for extracting a feature pattern of one dimension. The terminal splices the multiple single-channel feature patterns to obtain a multi-channel feature pattern of the video frame.

In this implementation, the terminal may use different convolution kernels to extract features of different dimensions of the video frames, and the multiple convolution kernels may operate in parallel, thereby improving the efficiency of feature extraction.

For example, if there may be a video frame, a corresponding expression matrix may be $$\begin{bmatrix} 2 & 1 & 2 \\ 1 & 3 & 1 \\ 2 & 2 & 4 \end{bmatrix},$$

the number in the matrix may be a gray value of the video frame, and the terminal may use convolution kernels $$\begin{bmatrix} 1 & 2 \\ 1 & 1 \end{bmatrix}, \begin{bmatrix} 2 & 2 \\ 1 & 1 \end{bmatrix}, \text{and } \begin{bmatrix} 1 & 2 \\ 2 & 2 \end{bmatrix}$$

to perform convolution processing on the video frame $$\begin{bmatrix} 2 & 1 & 2 \\ 1 & 3 & 1 \\ 2 & 2 & 4 \end{bmatrix}$$

to obtain three single-channel feature patterns $$\begin{bmatrix} 8 & 9 \\ 11 & 11 \end{bmatrix}, \begin{bmatrix} 9 & 10 \\ 12 & 14 \end{bmatrix}, \text{and } \begin{bmatrix} 12 & 13 \\ 15 & 17 \end{bmatrix}$$

of the video frame $$\begin{bmatrix} 2 & 1 & 2 \\ 1 & 3 & 1 \\ 2 & 2 & 4 \end{bmatrix}.$$

In the process of feature extraction, taking a convolution kernel $$\begin{bmatrix} 1 & 2 \\ 1 & 1 \end{bmatrix}$$

as an example, the terminal may control the convolution kernel $$\begin{bmatrix} 1 & 2 \\ 1 & 1 \end{bmatrix}$$

to slide on the video frame $$\begin{bmatrix} 2 & 1 & 2 \\ 1 & 3 & 1 \\ 2 & 2 & 4 \end{bmatrix}.$$

In the sliding process, the terminal obtains the sum of products of the value in the convolution kernel $$\begin{bmatrix} 1 & 2 \\ 1 & 1 \end{bmatrix}$$

and the corresponding value on the video frame $$\begin{bmatrix} 2 & 1 & 2 \\ 1 & 3 & 1 \\ 2 & 2 & 4 \end{bmatrix},$$

and uses the sum of products as a value in the single-channel feature pattern. Taking the convolution kernel $$\begin{bmatrix} 1 & 2 \\ 1 & 1 \end{bmatrix}$$

covering the $$\begin{bmatrix} 2 & 1 \\ 1 & 3 \end{bmatrix}$$

on the video frame as an example, the terminal may obtain the sum of products of the value in the convolution kernel $$\begin{bmatrix} 1 & 2 \\ 1 & 1 \end{bmatrix}$$

and the $$\begin{bmatrix} 2 & 1 \\ 1 & 3 \end{bmatrix}$$

at the corresponding position, that is, $1 \times 2 + 2 \times 1 + 1 \times 1 + 1 \times 3 = 8$, where 8 may be a value in the single-channel feature pattern. The terminal controls the convolution kernel $$\begin{bmatrix} 1 & 2 \\ 1 & 1 \end{bmatrix}$$

to slide on the video frame $$\begin{bmatrix} 2 & 1 & 2 \\ 1 & 3 & 1 \\ 2 & 2 & 4 \end{bmatrix}$$

to obtain multiple values. The terminal combines the obtained multiple values to obtain a single-channel feature pattern $$\begin{bmatrix} 8 & 9 \\ 11 & 11 \end{bmatrix}$$

of the video frame $$\begin{bmatrix} 2 & 1 & 2 \\ 1 & 3 & 1 \\ 2 & 2 & 4 \end{bmatrix}.$$

The terminal may superimpose three single-channel feature patterns $$\begin{bmatrix} 8 & 9 \\ 11 & 11 \end{bmatrix}, \begin{bmatrix} 9 & 10 \\ 12 & 14 \end{bmatrix}, \text{and } \begin{bmatrix} 12 & 13 \\ 15 & 17 \end{bmatrix}$$

to obtain a multi-channel feature pattern $$\left( \begin{bmatrix} 8 & 9 \\ 11 & 11 \end{bmatrix} \begin{bmatrix} 9 & 10 \\ 12 & 14 \end{bmatrix} \begin{bmatrix} 12 & 13 \\ 15 & 17 \end{bmatrix} \right)$$

of the video frame.

In the above example, the terminal uses different convolution kernels to extract features of different dimensions of the video frames, and the multiple convolution kernels may operate in parallel, thereby improving the efficiency of feature extraction.

In a possible implementation, for any one of the video frames, the terminal fills matrix edges of a matrix corresponding to the video frame, and uses multiple convolution kernels to perform feature extraction on the filled matrix corresponding to the video frame to obtain multiple single-channel feature patterns corresponding to the multiple convolution kernels respectively. The terminal splices the multiple single-channel feature patterns to obtain a multi-channel feature pattern of the video frame.

In this implementation, before using the convolution kernels to extract the multi-channel feature pattern of the video frame, the terminal may perform edge filling on the video frame, thereby ensuring that the edge information of the video frame may be completely collected by the convolution kernels, so as to improve the integrity of the information carried by the multi-channel feature pattern.

Taking an expression matrix corresponding to the video frame as $$\begin{bmatrix} 2 & 1 & 2 \\ 1 & 3 & 1 \\ 2 & 2 & 4 \end{bmatrix}$$

and the number of convolution kernels as three as an example, if the terminal directly uses a 3×3 convolution kernel to process the video frame, only one value may be obtained after processing, and the value may lose part of the edge information in the video frame $$\begin{bmatrix} 2 & 1 & 2 \\ 1 & 3 & 1 \\ 2 & 2 & 4 \end{bmatrix}.$$

In this case, the terminal may use 0 as a matrix element value to fill the edges of the video frame to obtain $$\begin{bmatrix} 0 & 0 & 0 & 0 & 0 \\ 0 & 2 & 1 & 2 & 0 \\ 0 & 1 & 3 & 1 & 0 \\ 0 & 2 & 2 & 4 & 0 \\ 0 & 0 & 0 & 0 & 0 \end{bmatrix}.$$

The terminal uses three convolution kernels $$\begin{bmatrix} 1 & 1 & 1 \\ 1 & 0 & 1 \\ 0 & 0 & 1 \end{bmatrix}, \begin{bmatrix} 0 & 1 & 1 \\ 1 & 0 & 1 \\ 0 & 1 & 0 \end{bmatrix}, \text{ and } \begin{bmatrix} 1 & 1 & 0 \\ 1 & 1 & 1 \\ 1 & 0 & 1 \end{bmatrix}$$

to perform convolution processing on the filled video frame to obtain three single-channel feature patterns $$\begin{bmatrix} 4 & 5 & 1 \\ 8 & 11 & 6 \\ 6 & 11 & 9 \end{bmatrix}, \begin{bmatrix} 2 & 7 & 2 \\ 1 & 7 & 9 \\ 6 & 10 & 3 \end{bmatrix}, \text{ and } \begin{bmatrix} 6 & 7 & 6 \\ 8 & 14 & 9 \\ 5 & 12 & 10 \end{bmatrix}.$$

In the process of feature extraction, taking a convolution kernel $$\begin{bmatrix} 1 & 1 & 1 \\ 1 & 0 & 1 \\ 0 & 0 & 1 \end{bmatrix}$$

as an example, the terminal may control the convolution kernel $$\begin{bmatrix} 1 & 1 & 1 \\ 1 & 0 & 1 \\ 0 & 0 & 1 \end{bmatrix}$$

to slide on the filled video frame $$\begin{bmatrix} 0 & 0 & 0 & 0 & 0 \\ 0 & 2 & 1 & 2 & 0 \\ 0 & 1 & 3 & 1 & 0 \\ 0 & 2 & 2 & 4 & 0 \\ 0 & 0 & 0 & 0 & 0 \end{bmatrix}.$$

In the sliding process, the terminal obtains the sum of products of the value in the convolution kernel $$\begin{bmatrix} 1 & 1 & 1 \\ 1 & 0 & 1 \\ 0 & 0 & 1 \end{bmatrix}$$

and the corresponding value on the filled video frame $$\begin{bmatrix} 0 & 0 & 0 & 0 & 0 \\ 0 & 2 & 1 & 2 & 0 \\ 0 & 1 & 3 & 1 & 0 \\ 0 & 2 & 2 & 4 & 0 \\ 0 & 0 & 0 & 0 & 0 \end{bmatrix},$$

and uses the sum of products as a value in the single-channel feature pattern. Taking the convolution kernel $$\begin{bmatrix} 1 & 1 & 1 \\ 1 & 0 & 1 \\ 0 & 0 & 1 \end{bmatrix}$$

covering the $$\begin{bmatrix} 0 & 0 & 0 \\ 0 & 2 & 1 \\ 0 & 1 & 3 \end{bmatrix}$$

on the video frame as an example, the terminal may obtain the sum of products of the value in the convolution kernel $$\begin{bmatrix} 1 & 1 & 1 \\ 1 & 0 & 1 \\ 0 & 0 & 1 \end{bmatrix}$$

and the $$\begin{bmatrix} 0 & 0 & 0 \\ 0 & 2 & 1 \\ 0 & 1 & 3 \end{bmatrix}$$

at the corresponding position, that is, 0×1+0×1+0×1+0×1+2×0+1×1+0×0+1×0+1×3=4, where 4 may be a value in the single-channel feature pattern. The terminal controls the convolution kernel $$\begin{bmatrix} 1 & 1 & 1 \\ 1 & 0 & 1 \\ 0 & 0 & 1 \end{bmatrix}$$

to slide on the filled video frame $$\begin{bmatrix} 0 & 0 & 0 & 0 & 0 \\ 0 & 2 & 1 & 2 & 0 \\ 0 & 1 & 3 & 1 & 0 \\ 0 & 2 & 2 & 4 & 0 \\ 0 & 0 & 0 & 0 & 0 \end{bmatrix}$$

to obtain multiple values. The terminal combines the obtained multiple values to obtain a single-channel feature pattern $$\begin{bmatrix} 4 & 5 & 1 \\ 8 & 11 & 6 \\ 6 & 11 & 9 \end{bmatrix}.$$

The terminal superimposes three single-channel feature patterns to obtain a multi-channel feature pattern $$\left( \begin{bmatrix} 4 & 5 & 1 \\ 8 & 11 & 6 \\ 6 & 11 & 9 \end{bmatrix} \begin{bmatrix} 2 & 7 & 2 \\ 1 & 7 & 9 \\ 6 & 10 & 3 \end{bmatrix} \begin{bmatrix} 6 & 7 & 6 \\ 8 & 14 & 9 \\ 5 & 12 & 10 \end{bmatrix} \right)$$

of the video frame. In this implementation, by filling the video frame through the terminal, the convolution kernels may collect the edge information of the video frame multiple times in the sliding process, so that the single-channel feature pattern may retain the information of the video frame to the greatest extent to ensure the integrity of the information of the video frame; and furthermore, the size of the single-channel feature pattern finally obtained after convolution processing may be the same as an original size of the video frame, thereby facilitating subsequent extraction of deeper features.

In addition, the above example may be described by taking the target video as a gray video and the video frame in the target video as a gray video frame. In other possible implementations, if the target video may be a color video and video frames in the target video are color video frames, the terminal may extract multi-channel feature patterns of multiple video frames in the following manner.

In a possible implementation, for any one of the video frames, the terminal uses multiple convolution kernel groups to perform feature extraction on the video frame to obtain multiple single-channel feature patterns corresponding to the multiple convolution kernel groups respectively, where each convolution kernel group includes a target number of convolution kernels, the target number may be the same as the number of color channels of the video frame, and the convolution kernels in one convolution kernel group are used for extracting features of one dimension. The terminal splices the multiple single-channel feature patterns to obtain a multi-channel feature pattern of the video frame.

In this implementation, the terminal may use different convolution kernel groups to perform feature extraction on different color channels of the video frame, so as to realize feature extraction on the color video frame.

Specifically, for a color matrix corresponding to each color channel in any one of the video frames, the terminal uses multiple convolution kernels to perform feature extraction on the color matrix to a color feature pattern corresponding to each color matrix, and fuses three color feature patterns corresponding to any one of the video frames to obtain a single-channel feature pattern corresponding to any one of the video frames.

For example, if a video frame includes three color channels RGB, the terminal may use three color matrices $$\begin{bmatrix} 1 & 1 & 2 \\ 1 & 2 & 0 \\ 0 & 2 & 1 \end{bmatrix}, \begin{bmatrix} 0 & 1 & 2 \\ 1 & 2 & 1 \\ 1 & 1 & 0 \end{bmatrix}, \text{and} \begin{bmatrix} 1 & 0 & 2 \\ 1 & 0 & 1 \\ 0 & 1 & 1 \end{bmatrix}$$

to represent the video frame. The terminal may use multiple convolution kernel groups to perform convolution processing on the video frame to obtain multiple single-channel feature patterns of the video frame. Taking one convolution kernel group as an example, since the video frame includes three color channels, one convolution kernel group includes three convolution kernels $$\begin{bmatrix} 1 & 0 \\ 0 & 1 \end{bmatrix}, \begin{bmatrix} 1 & 0 \\ 1 & 1 \end{bmatrix}, \text{and} \begin{bmatrix} 2 & 1 \\ 1 & 1 \end{bmatrix},$$

and the three convolution kernels are respectively used for extracting feature patterns of the three color channels. The terminal uses three convolution kernels $$\begin{bmatrix} 1 & 0 \\ 0 & 1 \end{bmatrix}, \begin{bmatrix} 1 & 0 \\ 1 & 1 \end{bmatrix}, \text{and} \begin{bmatrix} 2 & 1 \\ 1 & 1 \end{bmatrix}$$

to perform convolution processing on the three color matrices $$\begin{bmatrix} 1 & 1 & 2 \\ 1 & 2 & 0 \\ 0 & 2 & 1 \end{bmatrix}, \begin{bmatrix} 0 & 1 & 2 \\ 1 & 2 & 1 \\ 1 & 1 & 0 \end{bmatrix}, \text{and} \begin{bmatrix} 1 & 0 & 2 \\ 1 & 0 & 1 \\ 0 & 1 & 1 \end{bmatrix}$$

of the video frame respectively to obtain three color feature patterns $$\begin{bmatrix} 3 & 1 \\ 3 & 3 \end{bmatrix}, \begin{bmatrix} 3 & 4 \\ 3 & 3 \end{bmatrix}, \text{and} \begin{bmatrix} 3 & 3 \\ 3 & 1 \end{bmatrix}.$$

The terminal fuses the three color feature patterns $$\begin{bmatrix} 3 & 1 \\ 3 & 3 \end{bmatrix}, \begin{bmatrix} 3 & 4 \\ 3 & 3 \end{bmatrix}, \text{and} \begin{bmatrix} 3 & 3 \\ 3 & 1 \end{bmatrix}$$

to obtain a single-channel feature pattern of the video frame, where the process of fusing, by the terminal, the three color feature patterns $$\begin{bmatrix} 3 & 1 \\ 3 & 3 \end{bmatrix}, \begin{bmatrix} 3 & 4 \\ 3 & 3 \end{bmatrix}, \text{and} \begin{bmatrix} 3 & 3 \\ 3 & 1 \end{bmatrix}$$

may also be a process of adding the three color feature patterns $$\begin{bmatrix} 3 & 1 \\ 3 & 3 \end{bmatrix}, \begin{bmatrix} 3 & 4 \\ 3 & 3 \end{bmatrix}, \text{and } \begin{bmatrix} 3 & 3 \\ 3 & 1 \end{bmatrix},$$

thereby obtaining a single-channel feature pattern $$\begin{bmatrix} 9 & 8 \\ 9 & 7 \end{bmatrix}$$

of the video frame. The terminal may superimpose the single-channel feature patterns obtained by the multiple convolution kernel groups to obtain a multi-channel feature pattern of the video frame. The inventive concept of a superposition method may be the same as that in the above example, and will not be repeated here.

In some examples, on the basis of the above implementation, the terminal may further perform the following steps.

In a possible implementation, for any one of the video frames, the terminal fills the edges of the color matrix of the video frame, and uses multiple convolution kernel groups to perform feature extraction on the filled video frame to obtain multiple single-channel feature patterns corresponding to the multiple convolution kernel groups respectively. The terminal splices the multiple single-channel feature patterns to obtain a multi-channel feature pattern of the video frame.

In this implementation, before using the convolution kernel groups to extract the multi-channel feature pattern of the video frame, the terminal may perform edge filling on the color matrix of the video frame, thereby ensuring that the edge information of the video frame may be completely collected by the convolution kernel groups, so as to improve the integrity of the information carried by the multi-channel feature pattern.

For example, if a video frame includes three color channels RGB, the terminal may use three color matrices $$\begin{bmatrix} 1 & 1 & 2 \\ 1 & 2 & 0 \\ 0 & 2 & 1 \end{bmatrix}, \begin{bmatrix} 0 & 1 & 2 \\ 1 & 2 & 1 \\ 1 & 1 & 0 \end{bmatrix}, \text{and } \begin{bmatrix} 1 & 0 & 2 \\ 1 & 0 & 1 \\ 0 & 1 & 1 \end{bmatrix}$$

to represent the video frame. The terminal may perform edge filling on three color matrices $$\begin{bmatrix} 1 & 1 & 2 \\ 1 & 2 & 0 \\ 0 & 2 & 1 \end{bmatrix}, \begin{bmatrix} 0 & 1 & 2 \\ 1 & 2 & 1 \\ 1 & 1 & 0 \end{bmatrix}, \text{and } \begin{bmatrix} 1 & 0 & 2 \\ 1 & 0 & 1 \\ 0 & 1 & 1 \end{bmatrix}$$

to obtain three filled color matrices $$\begin{bmatrix} 0 & 0 & 0 & 0 & 0 \\ 0 & 1 & 1 & 2 & 0 \\ 0 & 1 & 2 & 0 & 0 \\ 0 & 0 & 2 & 1 & 0 \\ 0 & 0 & 0 & 0 & 0 \end{bmatrix}, \begin{bmatrix} 0 & 0 & 0 & 0 & 0 \\ 0 & 0 & 1 & 2 & 0 \\ 0 & 1 & 2 & 1 & 0 \\ 0 & 1 & 1 & 0 & 0 \\ 0 & 0 & 0 & 0 & 0 \end{bmatrix}, \text{and } \begin{bmatrix} 0 & 0 & 0 & 0 & 0 \\ 0 & 1 & 0 & 2 & 0 \\ 0 & 1 & 0 & 1 & 0 \\ 0 & 0 & 1 & 1 & 0 \\ 0 & 0 & 0 & 0 & 0 \end{bmatrix}.$$

The terminal uses multiple convolution kernel groups to perform convolution processing on the three filled color matrices to obtain multiple single-channel feature patterns of the video frame. Taking one convolution kernel group as an example, since the video frame includes three color channels, one convolution kernel group includes three convolution kernels $$\begin{bmatrix} 1 & 0 & 1 \\ 1 & 0 & 0 \\ 0 & 1 & 1 \end{bmatrix}, \begin{bmatrix} 1 & 0 & 1 \\ 0 & 1 & 0 \\ 0 & 1 & 1 \end{bmatrix}, \text{and } \begin{bmatrix} 1 & 0 & 1 \\ 0 & 0 & 1 \\ 0 & 1 & 0 \end{bmatrix},$$

and the three convolution kernels are respectively used for extracting feature patterns of the three color channels. The terminal uses three convolution kernels $$\begin{bmatrix} 1 & 0 & 1 \\ 1 & 0 & 0 \\ 0 & 1 & 1 \end{bmatrix}, \begin{bmatrix} 1 & 0 & 1 \\ 0 & 1 & 0 \\ 0 & 1 & 1 \end{bmatrix}, \text{and } \begin{bmatrix} 1 & 0 & 1 \\ 0 & 0 & 1 \\ 0 & 1 & 0 \end{bmatrix}$$

to perform convolution processing on the three filled color matrices $$\begin{bmatrix} 0 & 0 & 0 & 0 & 0 \\ 0 & 1 & 1 & 2 & 0 \\ 0 & 1 & 2 & 0 & 0 \\ 0 & 0 & 2 & 1 & 0 \\ 0 & 0 & 0 & 0 & 0 \end{bmatrix}, \begin{bmatrix} 0 & 0 & 0 & 0 & 0 \\ 0 & 0 & 1 & 2 & 0 \\ 0 & 1 & 2 & 1 & 0 \\ 0 & 1 & 1 & 0 & 0 \\ 0 & 0 & 0 & 0 & 0 \end{bmatrix}, \text{and } \begin{bmatrix} 0 & 0 & 0 & 0 & 0 \\ 0 & 1 & 0 & 2 & 0 \\ 0 & 1 & 0 & 1 & 0 \\ 0 & 0 & 1 & 1 & 0 \\ 0 & 0 & 0 & 0 & 0 \end{bmatrix}$$

of the video frame respectively to obtain three color feature patterns $$\begin{bmatrix} 3 & 3 & 1 \\ 3 & 7 & 4 \\ 2 & 1 & 4 \end{bmatrix}, \begin{bmatrix} 3 & 4 & 3 \\ 4 & 5 & 2 \\ 3 & 3 & 2 \end{bmatrix}, \text{and } \begin{bmatrix} 1 & 2 & 1 \\ 0 & 5 & 1 \\ 1 & 3 & 0 \end{bmatrix}.$$

The terminal fuses the three color feature patterns $$\begin{bmatrix} 3 & 3 & 1 \\ 3 & 7 & 4 \\ 2 & 1 & 4 \end{bmatrix}, \begin{bmatrix} 3 & 4 & 3 \\ 4 & 5 & 2 \\ 3 & 3 & 2 \end{bmatrix}, \text{and } \begin{bmatrix} 1 & 2 & 1 \\ 0 & 5 & 1 \\ 1 & 3 & 0 \end{bmatrix}$$

to obtain a single-channel feature pattern of the video frame, where the process of fusing, by the terminal, the three color feature patterns $$\begin{bmatrix} 3 & 3 & 1 \\ 3 & 7 & 4 \\ 2 & 1 & 4 \end{bmatrix}, \begin{bmatrix} 3 & 4 & 3 \\ 4 & 5 & 2 \\ 3 & 3 & 2 \end{bmatrix}, \text{and } \begin{bmatrix} 1 & 2 & 1 \\ 0 & 5 & 1 \\ 1 & 3 & 0 \end{bmatrix}$$

may also be a process of adding the three color feature patterns $$\begin{bmatrix} 3 & 3 & 1 \\ 3 & 7 & 4 \\ 2 & 1 & 4 \end{bmatrix}, \begin{bmatrix} 3 & 4 & 3 \\ 4 & 5 & 2 \\ 3 & 3 & 2 \end{bmatrix}, \text{and } \begin{bmatrix} 1 & 2 & 1 \\ 0 & 5 & 1 \\ 1 & 3 & 0 \end{bmatrix},$$

thereby obtaining a single-channel feature pattern $$\begin{bmatrix} 7 & 9 & 5 \\ 7 & 17 & 7 \\ 6 & 7 & 6 \end{bmatrix}$$

of the video frame. The terminal may superimpose the single-channel feature patterns obtained by the multiple convolution kernel groups to obtain a multi-channel feature pattern of the video frame. The inventive concept of a superposition method may be the same as that in the above example, and will not be repeated here.

303: Determine, by the terminal, a first attention weight of each multi-channel feature pattern based on a similarity between every two multi-channel feature patterns in the multiple multi-channel feature patterns, the first attention weight being used for representing the degree of correlation between a corresponding multi-channel feature pattern and an action performed by an object in the target video.

In some examples, the first attention weight may be inversely proportional to the similarity between two multi-channel feature patterns; in other words, for any one of the multi-channel feature patterns, if a similarity between another multi-channel feature pattern and the multi-channel feature pattern may be higher, it means that two video frames corresponding to the two multi-channel feature patterns respectively do not change greatly in time sequence, and include limited action-related information; and correspondingly, during action recognition, the attention weight between the two multi-channel feature patterns may be smaller. If a similarity between another multi-channel feature pattern and the multi-channel feature pattern may be lower, it means that video frames corresponding to the two multi-channel feature patterns respectively change greatly in time sequence, and include more action-related information; and correspondingly, during action recognition, the attention weight between the two multi-channel feature patterns may be larger.

In a possible implementation, the terminal performs dimension reduction processing on the multiple multi-channel feature patterns to obtain multiple first feature vectors, and each multi-channel feature pattern corresponds to a first feature vector. The terminal determines a first attention weight of each first feature vector based on a similarity between every two first feature vectors in the multiple first feature vectors.

In order to describe the above implementation more clearly, the above implementation will be divided into two parts for description, where the first part describes a method of obtaining, by the terminal, first feature vectors, and the second part describes a method of determining, by the terminal, first attention weights.

First part: in a possible implementation, for any one of the multi-channel feature patterns, the terminal performs dimension reduction processing on multiple single-channel feature patterns in the multi-channel feature pattern respectively to obtain multiple feature values corresponding to the multiple single-channel feature patterns respectively. The terminal combines the multiple feature values to obtain a first feature vector of the multi-channel feature pattern.

In this implementation, the terminal may reduce the dimensions of the single-channel feature patterns to obtain feature values, and splice the feature values of the multiple single-channel feature patterns into a feature vector of the multi-channel feature pattern. Compared with the multi-channel feature pattern, the feature vector includes a smaller amount of data, so that the efficiency of subsequently obtaining attention weights may be improved so as to improve the efficiency of action recognition.

For example, the terminal may obtain the first feature vector of the multi-channel feature pattern through the following formula (1).

$$z_t = \text{Conv}(x_t, W_1), 1 \leq t \leq T \quad (1),$$

where t represents a sequence number of a first feature vector, $z_t$ represents a first feature vector of which the sequence number may be t, $x_t$ represents a multi-channel feature pattern of which the number may be t, t may be a positive integer, Conv ( ) represents a convolution function, $W_1$ represents a parameter matrix of 1×1 convolution kernels, and T represents the number of multi-channel feature patterns. In some examples, $x_t$ represents the above multi-channel feature pattern, and $z_t$ represents the first feature vector of the above multi-channel feature pattern.

For example, taking one multi-channel feature pattern including three single-channel feature patterns as an example, if the multi-channel feature pattern may be $$\left( \begin{bmatrix} 4 & 5 & 1 \\ 8 & 11 & 6 \\ 6 & 11 & 9 \end{bmatrix} \begin{bmatrix} 2 & 7 & 2 \\ 1 & 7 & 9 \\ 6 & 10 & 3 \end{bmatrix} \begin{bmatrix} 6 & 7 & 6 \\ 8 & 14 & 9 \\ 5 & 12 & 10 \end{bmatrix} \right),$$

three matrices in parentheses are the three single-channel feature patterns included in the multi-channel feature pattern. The terminal may perform average pooling on the three single-channel feature patterns, and convert the three single-channel feature patterns $$\begin{bmatrix} 4 & 5 & 1 \\ 8 & 11 & 6 \\ 6 & 11 & 9 \end{bmatrix} \begin{bmatrix} 2 & 7 & 2 \\ 1 & 7 & 9 \\ 6 & 10 & 3 \end{bmatrix} \begin{bmatrix} 6 & 7 & 6 \\ 8 & 14 & 9 \\ 5 & 12 & 10 \end{bmatrix}$$

into three feature values, that is, the terminal respectively obtains average values 7.9, 5.2 and 8.5 of values in the three single-channel feature patterns $$\begin{bmatrix} 4 & 5 & 1 \\ 8 & 11 & 6 \\ 6 & 11 & 9 \end{bmatrix} \begin{bmatrix} 2 & 7 & 2 \\ 1 & 7 & 9 \\ 6 & 10 & 3 \end{bmatrix} \begin{bmatrix} 6 & 7 & 6 \\ 8 & 14 & 9 \\ 5 & 12 & 10 \end{bmatrix},$$

and obtains the three average values 7.9, 5.2 and 8.5 as three feature values. The terminal combines the three feature values 7.9, 5.2 and 8.5 to obtain a first feature vector (7.9, 5.2, 8.5) of the multi-channel feature pattern. In this way, the terminal may use the average values of the values in the single-channel feature patterns for representing the single-channel feature patterns, thereby reducing the amount of computation and improving the processing efficiency.

In the above example, the terminal performs dimension reduction processing on the single-channel feature patterns by average pooling for description. In other possible implementations, the terminal may perform dimension reduction processing on the single-channel feature patterns by maximum pooling or minimum pooling to obtain feature values corresponding to the single-channel feature patterns. The following will describe a method of performing, by the terminal, dimension reduction processing on single-channel feature patterns by maximum pooling.

For example, taking one multi-channel feature pattern including three single-channel feature patterns as an example, if the multi-channel feature pattern may be $$\left(\begin{bmatrix} 4 & 5 & 1 \\ 8 & 11 & 6 \\ 6 & 11 & 9 \end{bmatrix}\begin{bmatrix} 2 & 7 & 2 \\ 1 & 7 & 9 \\ 6 & 10 & 3 \end{bmatrix}\begin{bmatrix} 6 & 7 & 6 \\ 8 & 14 & 9 \\ 5 & 12 & 10 \end{bmatrix}\right),$$

three matrices in parentheses are the three single-channel feature patterns included in the multi-channel feature pattern. The terminal may perform maximum pooling on the three single-channel feature patterns, and convert the three single-channel feature patterns $$\begin{bmatrix} 4 & 5 & 1 \\ 8 & 11 & 6 \\ 6 & 11 & 9 \end{bmatrix}\begin{bmatrix} 2 & 7 & 2 \\ 1 & 7 & 9 \\ 6 & 10 & 3 \end{bmatrix}\begin{bmatrix} 6 & 7 & 6 \\ 8 & 14 & 9 \\ 5 & 12 & 10 \end{bmatrix}$$

into three feature values, that is, the terminal respectively obtains maximum values 11, 10 and 14 of values in the three single-channel feature patterns $$\begin{bmatrix} 4 & 5 & 1 \\ 8 & 11 & 6 \\ 6 & 11 & 9 \end{bmatrix}\begin{bmatrix} 2 & 7 & 2 \\ 1 & 7 & 9 \\ 6 & 10 & 3 \end{bmatrix}\begin{bmatrix} 6 & 7 & 6 \\ 8 & 14 & 9 \\ 5 & 12 & 10 \end{bmatrix},$$

and obtains the three maximum values 11, 10 and 14 as three feature values. The terminal combines the three feature values 11, 10 and 14 to obtain a first feature vector (11, 10, 14) of the multi-channel feature pattern. In this way, the terminal may use the maximum values of the values in the single-channel feature patterns for representing the single-channel feature patterns, thereby reducing the amount of computation and improving the processing efficiency.

Second part: for any one of the first feature vectors, the terminal respectively obtains multiple similarities between the first feature vector and the multiple first feature vectors. The terminal determines a first attention weight of the first feature vector based on the sum of products of the multiple first feature vectors and the corresponding similarities.

In this implementation, the terminal may use the first feature vectors for representing the corresponding multi-channel feature patterns, and use the similarity between the first feature vectors for representing the similarity between the multi-channel feature patterns, thereby reducing the number of parameters and improving the operation efficiency.

For example, the terminal may respectively obtain the similarities between the first feature vector and the multiple first feature vectors through the following formula (2), obtain the sum of products of the multiple first feature vectors and the corresponding similarities through the following formula (3), and obtain the first attention weight of the first feature vector through the following formula (4).

$$d_{tj}=-z_t \cdot z_j, 1 \le t \le T, 1 \le j \le T \tag{2}$$

where $d_{tj}$ represents a similarity between a first feature vector $z_t$ and a first feature vector $z_j$, $z_t$ and $z_j$, respectively represent a first feature vector of which the sequence number may be t and a first feature vector of which the sequence number may be j, T represents the number of channel feature patterns, that is, the number of first feature vectors corresponding to the channel feature patterns, both t and j represent sequence numbers of first feature vectors, and both t and j are positive integers. In some examples, $$\sum_{j=1}^{T} d_{tj} = 1,$$

indicating that the sum of multiple similarities may be 1.

$$\hat{z}_t = z_t + \sum_{j=1}^{T} d_{tj} z_j, \ 1 \le t \le T, \tag{3}$$

where t represents a sequence number of the sum of products, $\hat{z}_t$ represents the sum of products of which the sequence number may be t, and the sum of products $\hat{z}_t$ corresponds to a multi-channel feature pattern $x_t$.

$$a_t = \sigma(\text{Conv}(\hat{z}_t, W_2)), 1 \le t \le T \tag{4},$$

where t represents a sequence number of a first attention weight, $a_t$ represents a first attention weight of which the sequence number may be t, $\sigma()$ represents a normalization function, $W_2$ represents a parameter matrix, and the first attention weight $a_t$ corresponds to a multi-channel feature pattern $x_t$. In some examples, $a_t$ represents a first attention weight of the first feature vector.

Taking any one of the first feature vectors as an example for description, the terminal respectively obtains multiple similarities between the first feature vector and the multiple first feature vectors. The terminal performs normalization processing on the sum of products of the multiple first feature vectors and the corresponding similarities to obtain a first attention weight of the first feature vector. For example, if there are three video frames in a target video, the three video frames are marked as a video frame A, a video frame B, and a video frame C in the order of playing time. After the processing of the first part, the terminal may respectively obtain three first feature vectors corresponding to the three video frames.

Taking a first feature vector (1, 2, 3) of the video frame A, a first feature vector (1, 4, 3) of the video frame B and a first feature vector (2, 1, 2) of the video frame C as an example, for the video frame A, the terminal may obtain a cosine similarity 0.94 between the first feature vector (1, 2, 3) of the video frame A and the first feature vector (1, 4, 3) of the video frame B, and a cosine similarity 0.89 between the first feature vector (1, 2, 3) of the video frame A and the first feature vector (2, 1, 2) of the video frame C. The terminal obtains the cosine similarity 0.94 between the first feature vector (1, 2, 3) of the video frame A and the first feature vector (1, 4, 3) of the video frame B, and the product of the cosine similarity and the first feature vector (1, 4, 3) of the video frame B may be (0.94, 3.76, 2.82). The terminal obtains the cosine similarity 0.89 between the first feature vector (1, 2, 3) of the video frame A and the first feature vector (2, 1, 2) of the video frame C, and the product of the cosine similarity and the first feature vector (2, 1, 2) of the video frame C may be (1.78, 0.89, 1.78). The terminal fuses the first feature vector (1, 2, 3) of the video frame A with the product (0.94, 3.76, 2.82) and the product (1.78, 0.89, 1.78) to obtain the sum of products (3.72, 6.65, 7.6). The terminal performs normalization processing on the sum of products (3.72, 6.65, 7.6) through a Sigmoid function to obtain a first attention weight (0.97, 0.99, 0.99), where the numbers respectively represent the weights of three single-channel feature patterns in a multi-channel feature pattern of the video frame A. For the first feature vectors of the video frame B and the video frame C, the terminal may determine a first attention weight of the first feature vector of the video frame B based on the cosine similarity between the video frame B and the first feature vector of the video frame A as well as the first feature vector of the video frame C respectively. The terminal may determine a first attention weight of the first feature vector of the video frame C based on the cosine similarity between the video frame C and the first feature vector of the video frame A as well as the first feature vector of the video frame B respectively.

In the above example, the terminal uses the Sigmoid function for obtaining the first attention weight, and uses the cosine similarity for representing the similarity between vectors for description. In other possible implementations, the terminal may use other activation functions for obtaining the first attention weight, for example, use a Softmax function for performing normalization processing on the sum of products to obtain the first attention weight, and may use a dot product of vectors for representing the similarity between the vectors, which may not be limited in the examples of the present subject matter.

304: Multiply, by the terminal, the multiple first attention weights by the multiple multi-channel feature patterns to obtain multiple first attention feature patterns, each video frame corresponding to one first attention feature pattern.

In a possible implementation, the terminal may process each first attention weight and the corresponding multi-channel feature pattern through the following formula (5), so as to obtain multiple first attention feature patterns.

$$u_t = x_t \sqcup a_t, 1 \leq t \leq T \qquad (5),$$

where $u_t$ represents a first attention feature pattern of which the number may be t, and the first attention feature pattern $u_t$ corresponds to a multi-channel feature pattern $x_t$.

Taking a multi-channel feature pattern $$\left( \begin{bmatrix} 4 & 5 & 1 \\ 8 & 11 & 6 \\ 6 & 11 & 9 \end{bmatrix} \begin{bmatrix} 2 & 7 & 2 \\ 1 & 7 & 9 \\ 6 & 10 & 3 \end{bmatrix} \begin{bmatrix} 6 & 7 & 6 \\ 8 & 14 & 9 \\ 5 & 12 & 10 \end{bmatrix} \right),$$

as an example, the terminal may multiply the multi-channel feature pattern by a corresponding first attention weight, such as (0.8, 0.75, 0.9), so as to obtain a first attention feature pattern $$\left( \begin{bmatrix} 3.2 & 4 & 0.8 \\ 6.4 & 8.8 & 4.8 \\ 4.8 & 8.8 & 7.2 \end{bmatrix} \begin{bmatrix} 1.5 & 5.25 & 1.5 \\ 0.75 & 5.25 & 6.75 \\ 4.5 & 7.5 & 2.25 \end{bmatrix} \begin{bmatrix} 5.4 & 6.3 & 5.4 \\ 7.2 & 12.6 & 8.1 \\ 4.5 & 10.8 & 9 \end{bmatrix} \right)$$

of the multi-channel feature pattern. In this way, the terminal may multiply multiple multi-channel feature patterns by corresponding multiple first attention weights to obtain multiple first attention feature patterns. Since the first attention weight represents the degree of correlation between the multi-channel feature pattern and the action, after the multi-channel feature pattern may be multiplied by the corresponding first attention weight, action-related single-channel feature patterns in the multi-channel feature pattern may be highlighted, and action-unrelated single-channel feature patterns may be suppressed, so as to improve the accuracy of subsequent action recognition.

305: Perform recognition by the terminal based on the multiple first attention feature patterns to obtain a type of the action.

In a possible implementation, for any one of the first attention feature patterns, the terminal performs full connection processing on the first attention feature pattern to obtain a first attention feature vector of the first attention feature pattern. The terminal performs normalization processing on the first attention feature vector to obtain a first prediction vector of the first attention feature vector. The terminal determines a type of the action based on the first prediction vector.

In this implementation, the first attention feature pattern may be a feature pattern determined based on the first attention weight, the first attention weight highlights the action-related information, and the terminal performs action recognition based on the first attention feature pattern, so that a more accurate recognition effect may be obtained.

For example, for a first attention feature pattern $$\left( \begin{bmatrix} 3.2 & 4 & 0.8 \\ 6.4 & 8.8 & 4.8 \\ 4.8 & 8.8 & 7.2 \end{bmatrix} \begin{bmatrix} 1.5 & 5.25 & 1.5 \\ 0.75 & 5.25 & 6.75 \\ 4.5 & 7.5 & 2.25 \end{bmatrix} \begin{bmatrix} 5.4 & 6.3 & 5.4 \\ 7.2 & 12.6 & 8.1 \\ 4.5 & 10.8 & 9 \end{bmatrix} \right),$$

the terminal may multiply the first attention feature pattern by a weight matrix $[2, 2, 3]^T$ and then add a result to a bias matrix $[1, 1, 1]^T$, so as to obtain three attention feature vectors $[17.8, 44.8, 48.8]^T$, $[18, 32.25, 30.75]^T$ and $[39.6, 63.9, 57.6]^T$ of the first attention feature pattern. The terminal fuses the three attention feature vectors to obtain a first attention feature vector $[150.8, 281.9, 137.15]^T$ of the first attention feature pattern. The terminal uses the Softmax function for performing normalization processing on the first attention feature vector to obtain a first prediction vector $[0.26, 0.50, 0.24]^T$ of the first attention feature vector. If the type of the action corresponding to the value 0.5 in the first prediction vector $[0.26, 0.50, 0.24]^T$ may be running, the terminal may determine running as the type of the action recognized based on the first attention feature pattern. Of course, one first attention feature pattern corresponds to one video frame, multiple first attention feature patterns correspond to multiple video frames, and the terminal may perform the above full connection processing and normalization processing on the multiple first attention feature patterns to obtain action recognition results of the multiple first attention feature patterns. Based on the action recognition results of the multiple first attention feature patterns, the terminal obtains the type of the action performed by an object in the target video. For example, the terminal may determine the type of the action that occurs most frequently in the action recognition results of the multiple first attention feature patterns as the type of the action performed by the object in the target video.

In addition to obtaining the type of the action performed by the object in the target video through the action recognition results of the multiple first attention feature patterns, the terminal may further fuse the first prediction vectors corresponding to the multiple first attention feature patterns to obtain a fused prediction vector. The terminal performs normalization processing on the fused prediction vector to obtain the type of the action performed by the object in the target video.

In a possible implementation, the above step 305 may further be implemented by the following steps 3051 to 3054:

3051: For any one of the first attention feature patterns, obtain, by the terminal, multiple second feature vectors corresponding to multiple feature points on the first attention feature pattern and multiple third feature vectors corresponding to multiple feature points on a reference attention feature pattern of the first attention feature pattern, and the video frame corresponding to the reference attention feature pattern being a video frame adjacent to the video frame corresponding to any one of the first attention feature patterns.

If there are a video frame D and a video frame E in a target video, the video frame D and the video frame E are adjacent video frames. In some examples, the video frame D may be the previous video frame of the video frame E, the video frame corresponding to the first attention feature pattern may be the video frame D, and the video frame corresponding to the reference attention feature pattern may be the video frame E.

In a possible implementation, since the first attention feature pattern may be a feature pattern obtained by multiplying the multi-channel feature pattern by the first attention weight, each first attention feature pattern includes multiple sub-attention feature patterns, and the number of the sub-attention feature patterns may be the same as the number of the single-channel feature patterns in the corresponding multi-channel feature pattern. Feature points at the same position on the multiple sub-attention feature patterns correspond to the same pixel point on the video frame. The terminal may splice the values of the feature points at the same position on the multiple sub-attention feature patterns of the first attention feature pattern to obtain multiple second feature vectors, and one second feature vector corresponds to one pixel point on the video frame, that is, one second feature vector corresponds to one pixel point on the video frame D. The terminal splices the values of the feature points at the same position on the multiple sub-attention feature patterns of the reference attention feature pattern to obtain multiple third feature vectors, and one third feature vector corresponds to one pixel point on the video frame, that is, one third feature vector corresponds to one pixel point on the video frame E.

In this implementation, the terminal obtains the feature vector of each feature point from multiple sub-attention feature patterns of one first attention feature pattern to facilitate the subsequent comparison of the differences between pixel points at the same position in different video frames, thereby obtaining action-related information, and improving the accuracy of subsequent action recognition.

Figure 4:
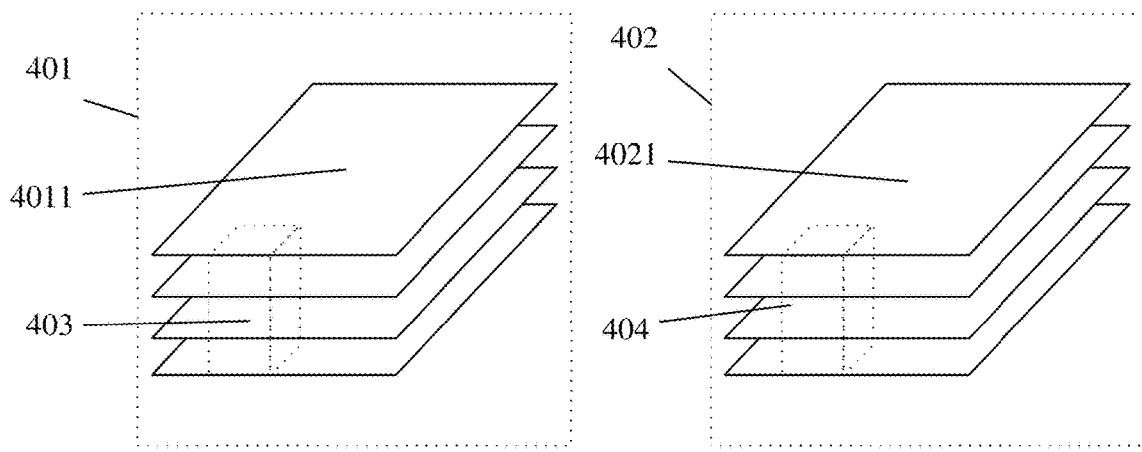
FIG. 4 is a schematic diagram of a multi-channel feature pattern provided by an example of the present subject matter.

For example, referring to FIG. 4, FIG. 4 includes a first attention feature pattern 401 and a reference feature pattern 402 of the first attention feature pattern 401, the first attention feature pattern 401 includes multiple sub-attention feature patterns 4011, and the reference feature pattern 402 includes multiple sub-attention feature patterns 4021. In FIG. 4, the multiple sub-attention feature patterns 4011 of the first attention feature pattern are arranged from top to bottom, and the positions of the multiple sub-attention feature patterns 4011 may be aligned with each other, that is, the projections of the multiple sub-attention feature patterns 4011 from top to bottom may be the same projection. In FIG. 4, the values of intersection points of a cube 403 and the multiple sub-attention feature patterns 4011 constitutes a second feature vector. In a similar way, in FIG. 4, the values of intersection points of a cube 404 and the multiple sub-attention feature patterns 4021 constitutes a third feature vector.

3052: Determine, by the terminal, multiple second attention weights corresponding to multiple feature points on the first attention feature pattern respectively based on similarities between the multiple second feature vectors and the multiple third feature vectors, the second attention weight being used for representing the degree of correlation between a corresponding feature point and the action.

In some examples, the second attention weight may be inversely proportional to the similarity between the second feature vector and the third feature vector; in other words, for any one of the second feature vectors, if a similarity between the corresponding third feature vector and the second feature vector may be higher, it means that two pixel points corresponding to the second feature vector and the third feature vector respectively do not change greatly in time sequence, and include limited action-related information; and correspondingly, during action recognition, the attention weight between the second feature vector and the third feature vector may be smaller. If a similarity between the corresponding third feature vector and the second feature vector may be lower, it means that pixel points corresponding to the second feature vector and the third feature vector respectively change greatly in time sequence, and include more action-related information; and correspondingly, during action recognition, the attention weight between the second feature vector and the third feature vector may be larger.

In a possible implementation, the terminal may obtain cosine similarities between the multiple second feature vectors and the corresponding multiple third feature vectors, so as to determine multiple second attention weights corresponding to multiple feature points on the first attention feature pattern respectively.

In this implementation, the terminal may determine the difference between pixel points at the same position on different video frames through the similarity between the second feature vector and the third feature vector, and determine the action information carried by the pixel points based on the difference, thereby improving the accuracy of subsequent action recognition.

For example, the terminal may obtain the similarity between the second feature vector and the third feature vector through the following formula (6) and formula (7).

$$s_t = \eta(xz_t^{(i,j)}, xz_{t+1}^{(i,j)}), 1 \leq t \leq T - 1, \quad (6)$$

$$\eta(x_t^{(i,j)}, x_{t+1}^{(i,j)}) = \frac{x_t^{(i,j)} \cdot x_{t+1}^{(i,j)}}{\|x_t^{(i,j)}\|_2 \|x_{t+1}^{(i,j)}\|_2}, \quad (7)$$

where t represents a sequence number of a cosine similarity, $s_t$ represents a cosine similarity between a second feature vector $xz_t^{(i,j)}$ and a third feature vector $xz_t^{(i,j)}$, $\eta$ ( ) represents a function of cosine similarity computation, $xz_t^{(i,j)}$ represents a second feature vector of a feature point (i, j) on a first attention feature pattern $xz_t$, $xz_{t+1}^{(i,j)}$ represents a third feature vector of a feature point (i, j) on a reference feature pattern $xz_{t+1}$, i and j respectively represent a horizontal coordinate and a vertical coordinate of a feature point, and $\|\ \|_2$ represents a two-norm.

Taking a second feature vector [1, 2, 5, 4, 2] and a third feature vector [2, 2, 1, 1, 1] corresponding to the second feature vector as an example, the terminal may obtain a cosine similarity 0.512 between the second feature vector [1, 2, 5, 4, 2] and the third feature vector [2, 2, 1, 1, 1]. The terminal may determine 1−0.512=0.488 as a second attention weight of the feature point corresponding to the second feature vector.

3053: Multiply, by the terminal, the multiple second attention weights by multiple feature points on the first attention feature pattern to obtain a second attention feature pattern of the first attention feature pattern.

In a possible implementation, the terminal may obtain the second attention feature pattern through the following formula (8).

$$v_t = BN(Conv(xz_t \cdot (1-s_t))) + x_t, 1 \leq t \leq T-1 \quad (8),$$

where t represents a sequence number of a second attention feature pattern, $v_t$ represents a second attention feature pattern of which the number may be t, BN represents an activation function, and $xz_t$ represents a first attention feature pattern of which the number may be t.

For example, for a first attention feature pattern $$\left( \begin{bmatrix} 3.2 & 4 & 0.8 \\ 6.4 & 8.8 & 4.8 \\ 4.8 & 8.8 & 7.2 \end{bmatrix} \begin{bmatrix} 1.5 & 5.25 & 1.5 \\ 0.75 & 5.25 & 6.75 \\ 4.5 & 7.5 & 2.25 \end{bmatrix} \begin{bmatrix} 5.4 & 6.3 & 5.4 \\ 7.2 & 12.6 & 8.1 \\ 4.5 & 10.8 & 9 \end{bmatrix} \right),$$

the terminal may multiply a second attention weight $$\begin{bmatrix} 0.6 & 0.4 & 0.8 \\ 0.4 & 0.8 & 0.8 \\ 0.5 & 0.3 & 0.2 \end{bmatrix}$$

corresponding to the first attention feature pattern, so as to obtain a second attention feature pattern $$\left( \begin{bmatrix} 1.92 & 1.6 & 0.64 \\ 2.56 & 9.6 & 3.84 \\ 2.4 & 2.64 & 1.44 \end{bmatrix} \begin{bmatrix} 0.9 & 2.1 & 1.2 \\ 0.3 & 4.2 & 5.4 \\ 2.25 & 2.25 & 0.45 \end{bmatrix} \begin{bmatrix} 3.24 & 2.52 & 4.32 \\ 2.88 & 10.08 & 6.48 \\ 2.25 & 3.24 & 1.8 \end{bmatrix} \right)$$

of the first attention feature pattern.

3054: Perform recognition by the terminal based on the multiple second attention feature patterns to obtain a type of the action.

In a possible implementation, for any one of the second attention feature patterns, the terminal performs full connection processing on the second attention feature pattern to obtain a first attention feature vector of the second attention feature pattern. The terminal performs normalization processing on the first attention feature vector to obtain a first prediction vector of the first attention feature vector. The terminal determines a type of the action based on the first prediction vector.

In this implementation, the second attention feature pattern may be a feature pattern determined based on the first attention weight, the first attention weight highlights the action-related information, and the terminal performs action recognition based on the second attention feature pattern, so that a more accurate recognition effect may be obtained.

For example, for a second attention feature pattern $$\left( \begin{bmatrix} 1.92 & 1.6 & 0.64 \\ 2.56 & 9.6 & 3.84 \\ 2.4 & 2.64 & 1.44 \end{bmatrix} \begin{bmatrix} 0.9 & 2.1 & 1.2 \\ 0.3 & 4.2 & 5.4 \\ 2.25 & 2.25 & 0.45 \end{bmatrix} \begin{bmatrix} 3.24 & 2.52 & 4.32 \\ 2.88 & 10.08 & 6.48 \\ 2.25 & 3.24 & 1.8 \end{bmatrix} \right),$$

the terminal may multiply the second attention feature pattern by a weight matrix $[2, 2, 3]^T$ and then add a result to a bias matrix $[1, 1, 1]^T$, so as to obtain three attention feature vectors $[8.96, 35.84, 14.4]^T$, $[9.6, 25.2, 10.35]^T$ and $[24.48, 45.36, 16.38]^T$ of the second attention feature pattern. The terminal fuses the three attention feature vectors to obtain a second attention feature vector $[43.04, 106.4, 41.13]^T$ of the second attention feature pattern. The terminal uses the Softmax function for performing normalization processing on the second attention feature vector to obtain a second prediction vector $[0.23, 0.56, 0.21]^T$ of the second attention feature vector. If the type of the action corresponding to the value 0.56 in the second prediction vector $[0.23, 0.56, 0.21]^T$ may be running, the terminal may determine running as the type of the action recognized based on the second attention feature pattern. Of course, one second attention feature pattern corresponds to one video frame, multiple second attention feature patterns correspond to multiple video frames, and the terminal may perform the above full connection processing and normalization processing on the multiple second attention feature patterns to obtain action recognition results of the multiple second attention feature patterns. Based on the action recognition results of the multiple second attention feature patterns, the terminal obtains the type of the action performed by an object in the target video. For example, the terminal may determine the type of the action that occurs most frequently in the action recognition results of the multiple second attention feature patterns as the type of the action performed by the object in the target video.

Through the above steps 3051 to 3054, the terminal may further determine the second attention weight on the basis of determining the first attention weight, both the first attention weight and the second attention weight may be used for highlighting action-related features, and action recognition may be performed based on the first attention weight and the second attention weight, so that the accuracy of action recognition may be improved.

All the foregoing optional technical solutions may be randomly combined to form optional examples of the present subject matter.

Figure 5:
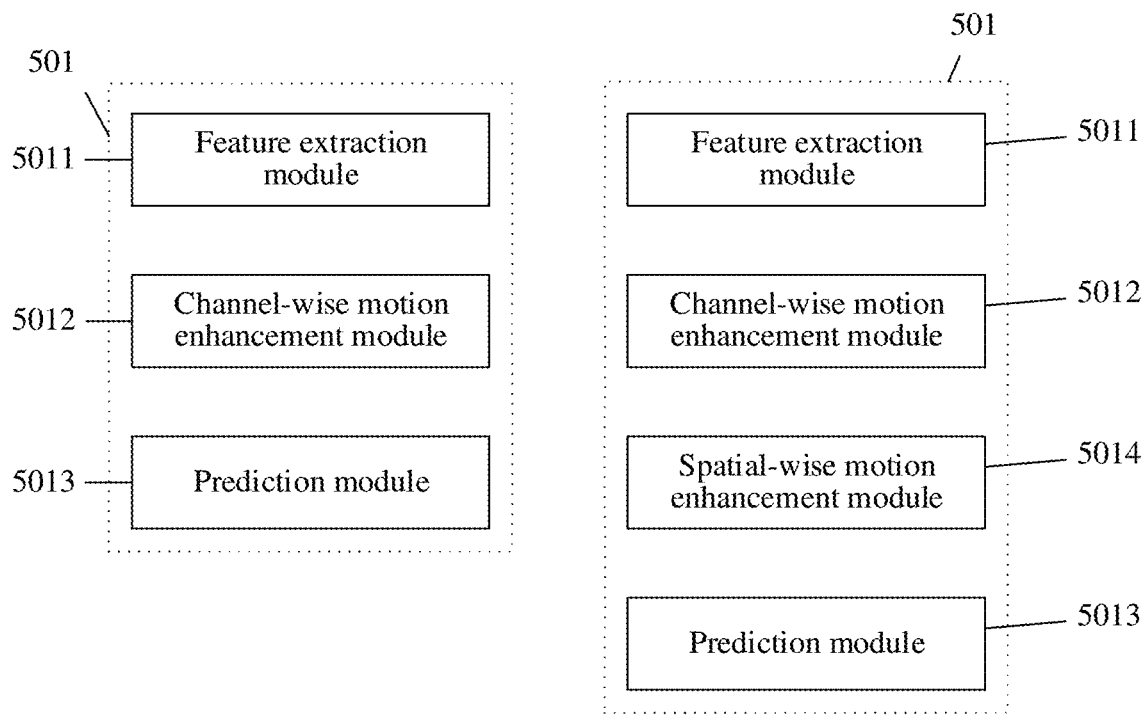
FIG. 5 is a schematic structural diagram of an action recognition model provided by an example of the present subject matter.

In order to describe the above steps 301 to 305 more clearly, the following description will be made with reference to the above optional implementations, FIG. 5, FIG. 6 and FIG. 7.

In some examples, the above steps 302 to 305 may be performed by different modules of an action recognition model. For example, referring to FIG. 5, the above step 302 may be performed by a feature extraction module 5011 of the action recognition model 501, the above steps 303 and 304 may be performed by a Channel-wise motion enhancement (CME) module 5012 of the action recognition model 501, and the first implementation in the above step 305 may be performed by a prediction module 5013 of the action recognition model 501; and in the second implementation of step 305, steps 3051 to 3053 may be performed by a Spatial-wise motion enhancement (SME) module 5014 of the action recognition model 501, and step 3054 may be performed by a prediction module 5013.

Figure 6:
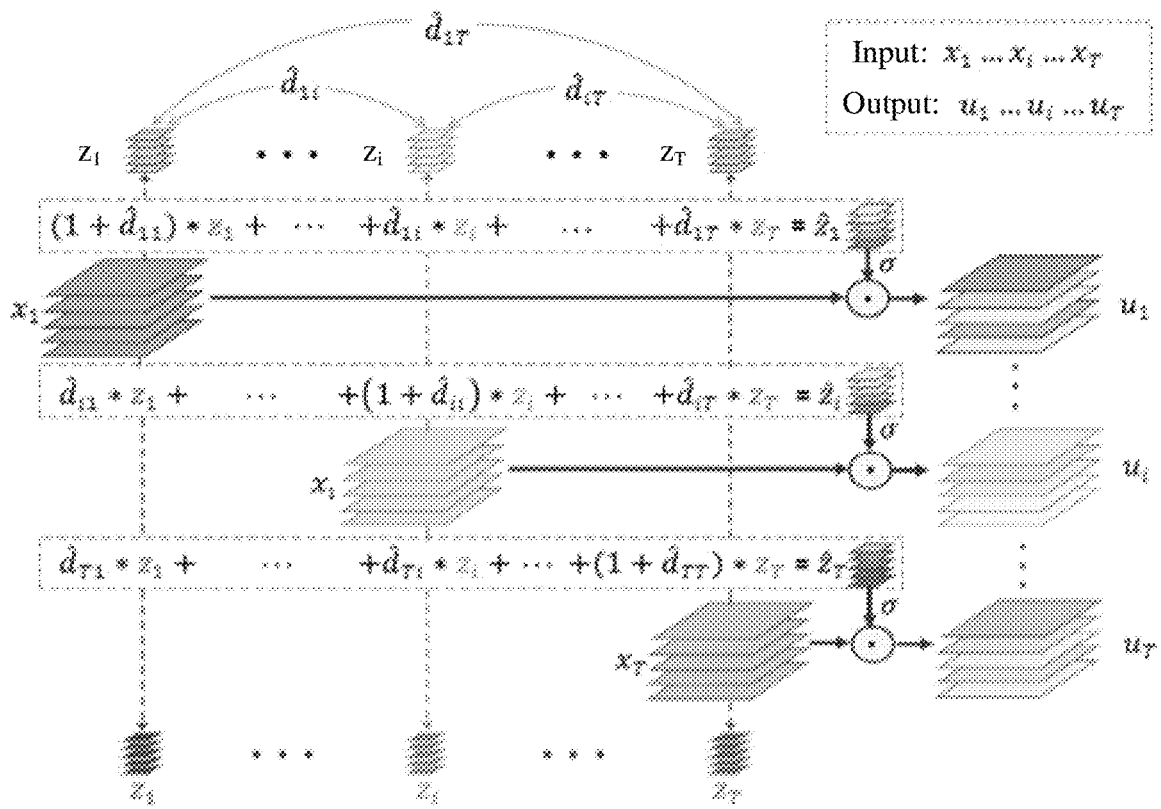
FIG. 6 is a schematic diagram of principle of a Channel-wise Motion Enhancement (CME) module provided by an example of the present subject matter.

FIG. 6 is a schematic diagram of the CME module 5012. The processing process of the CME module 5012 may be described below with reference to FIG. 6.

The "channel" in the CME module 5012 may be the "dimension" in the above steps 301 to 305, and one channel corresponds to one dimension. FIG. 6 includes three multi-channel feature patterns $x_1$, $x_i$, and $x_T$, and the three multi-channel feature patterns $x_1$, $x_i$, and $x_T$ correspond to three video frames in a target video. The terminal may perform global average pooling on the three multi-channel feature patterns $x_1$, $x_i$, and $x_T$ through the CME module 5012, so as to obtain three first feature vectors $z_1$, $z_i$, and $z_T$ corresponding to the three multi-channel feature patterns. In some examples, for the three first feature vectors $z_1$, $z_i$, and $z_T$, $z_1$ represents a first feature vector of which the sequence number may be 1 and also represents a primary first feature vector in the above formula (1), $z_i$ represents a first feature vector of which the sequence number may be i, i may be a positive integer with the same value range as t, and $z_T$ represents a first feature vector of which the sequence number may be T and also represents the last first feature vector in the above formula (1). The terminal obtains three first feature vectors $z_1$, $z_i$, and $z_T$ through the CME module 5012, that is, processes the three multi-channel feature patterns $x_1$, $x_i$, and $x_T$ respectively through formula (1) to obtain three first feature vectors $z_1$, $z_i$, and $z_T$.

The terminal obtains $d_{1i}$, $d_{1T}$ and $d_{iT}$ between the three first feature vectors $z_1$, $z_i$, and $z_T$ through the CME module 5012, where $d_{1i}$ represents a similarity between the first feature vectors $z_1$ and $z_i$, $d_{1T}$ represents a similarity between the first feature vectors $z_1$ and $z_T$, and $d_{iT}$ represents a similarity between the first feature vectors $z_i$ and $z_T$. In some examples, the similarity may be a cosine similarity between two first feature vectors, or a dot product of two first feature vectors. In some examples, the process of obtaining, by the terminal, $d_{1i}$, $d_{1T}$ and $d_{iT}$ between the three first feature vectors $z_1$, $z_i$ and $z_T$ through the CME module 5012 may be a process of respectively substituting the $z_1$, $z_i$ and $z_T$ into the above formula (2) to obtain $d_{1i}$, $d_{1T}$ and $d_{iT}$.

The terminal obtains the sum of products $\hat{z}_1$, $\hat{z}_i$ and $\hat{z}_T$ between the three first feature vectors $z_1$, $z_i$ and $z_T$ and the corresponding $d_{1i}$, $d_{1T}$ and $d_{1T}$ through the CME module 5012. In some examples, the process of obtaining the sum of products $\hat{z}_1$, $\hat{z}_i$ and $\hat{z}_T$ between the three first feature vectors $z_1$, $z_i$ and $z_T$ and the corresponding $d_{1i}$, $d_{1T}$ and $d_{iT}$ may be a process of respectively substituting the $z_1$, $z_i$ and $z_T$ and the corresponding $d_{1i}$, $d_{1T}$ and $d_{iT}$ into the above formula (3) to obtain the sum of products $\hat{z}_1$, $\hat{z}_i$ and $\hat{z}_T$.

The terminal may perform normalization processing (σ) on the sum of products corresponding to the three multi-channel feature patterns respectively through the CME module 5012, so as to obtain three first attention weights $a_1$, $a_i$ and $a_T$ corresponding to the three multi-channel feature patterns $x_1$, $x_i$ and $x_T$ respectively. In some examples, the process of obtaining, by the terminal, three first attention weights $a_1$, $a_i$ and $a_T$ corresponding to the three multi-channel feature patterns $x_1$, $x_i$ and $x_T$ respectively through the CME module 5012 may be a process of respectively substituting the sum of products $\hat{z}_1$, $\hat{z}_i$ and $\hat{z}_T$ corresponding to the three multi-channel feature patterns $x_1$, $x_i$ and $x_T$ respectively into the above formula (4) to obtain three first attention weights $a_1$, $a_i$ and $a_T$.

The terminal multiplies the three multi-channel feature patterns $x_1$, $x_i$ and $x_T$ by the corresponding three first attention weights $a_1$, $a_i$ and $a_T$ respectively to obtain three first attention feature patterns $u_1$, $u_i$ and $u_T$. In some examples, the process of obtaining, by the terminal, three first attention feature patterns $u_1$, $u_i$ and $u_T$ through the CME module 5012 may be a process of substituting the three multi-channel feature patterns $x_1$, $x_i$ and $x_T$ and the corresponding three first attention weights $a_1$, $a_i$ and $a_T$ into the above formula (5) to obtain three first attention feature patterns $u_1$, $u_i$ and $u_T$.

Figure 7:
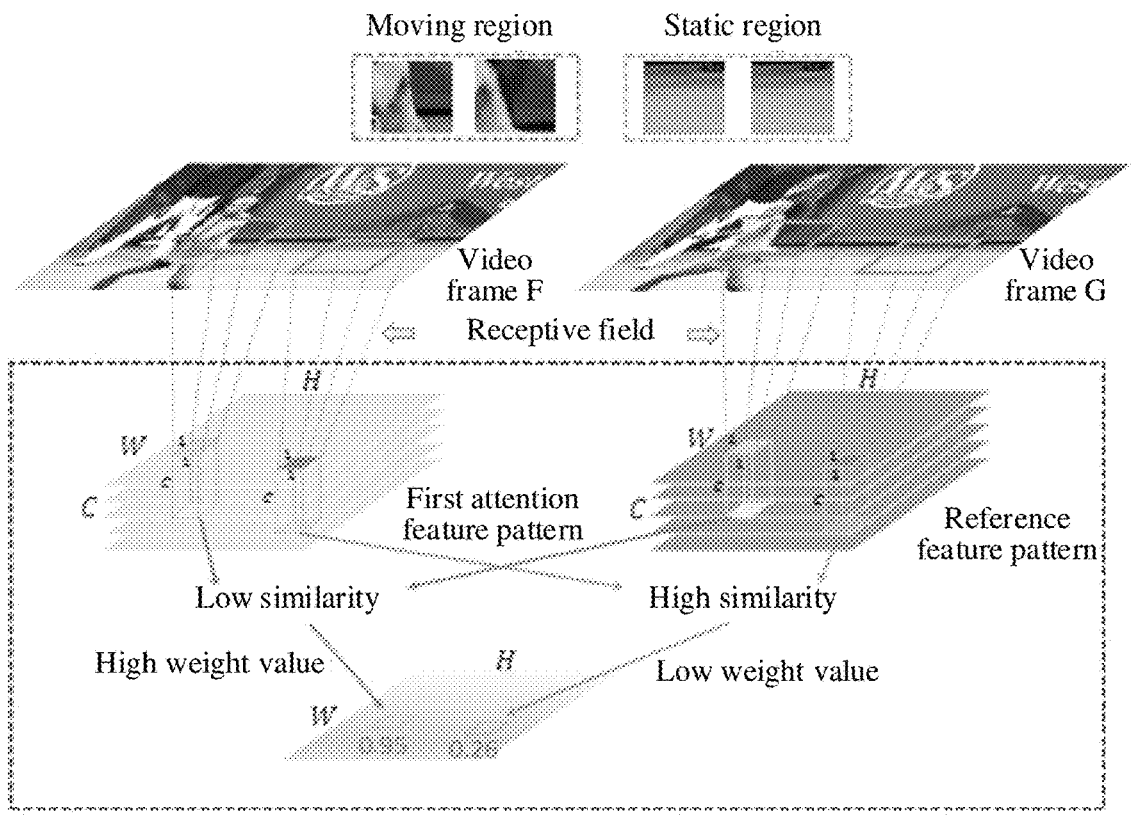
FIG. 7 is a schematic diagram of principle of a Spatial-wise Motion Enhancement (SME) module provided by another example of the present subject matter.

FIG. 7 is a schematic diagram of the SME module 5014. The processing process of the SME module 5014 may be described below with reference to FIG. 7.

Referring to FIG. 7, the SME module includes a first attention feature pattern and a reference feature pattern of the first attention feature pattern, the first attention feature pattern may be an attention feature pattern corresponding to a video frame F, and the reference feature pattern may be an attention feature pattern corresponding to a video frame G. Taking one feature point as an example, the terminal may obtain a second feature vector corresponding to the feature point on the first attention feature pattern and a third feature vector corresponding to the feature point at the same position on the reference feature pattern through the SME module 5014. The terminal may obtain a cosine similarity between the second feature vector and the third feature vector through the SME module 5014. In some examples, the process of obtaining, by the terminal, the cosine similarity between the second feature vector and the third feature vector through the SME module 5014 may be a process of substituting the second feature vector and the third feature vector into the above formulas (6) and (7) to obtain the corresponding cosine similarity.

The terminal determines a second attention weight of the feature point based on the cosine similarity through the SME module 5014, and multiplies the second attention weight by the corresponding feature point to obtain a second attention feature pattern. In some examples, the terminal obtains the second attention feature pattern through the SME module 5014 based on the above formula (8).

Figure 8:
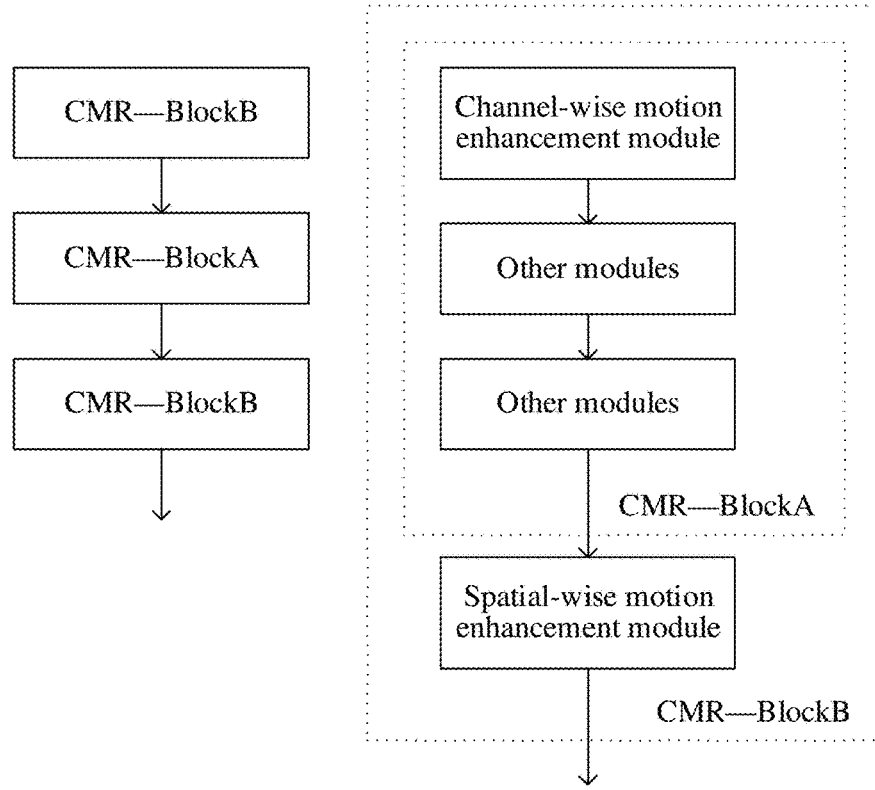
FIG. 8 is a schematic diagram of module alternation provided by an example of the present subject matter.

The action recognition model may include multiple CME modules 5012 and multiple SME modules 5014, and the CME modules 5012 and the SME modules 5014 may be used alternately in the action recognition model. In some examples, if a module only includes the CME module 5012, it may be called CMR-BlockA; and if a module includes both the CME module 5012 and the SME module 5014, it may be called CMR-BlockB. An alternate example of CMR-BlockA and CMR-BlockB may be shown in FIG. 8.

Figure 9:
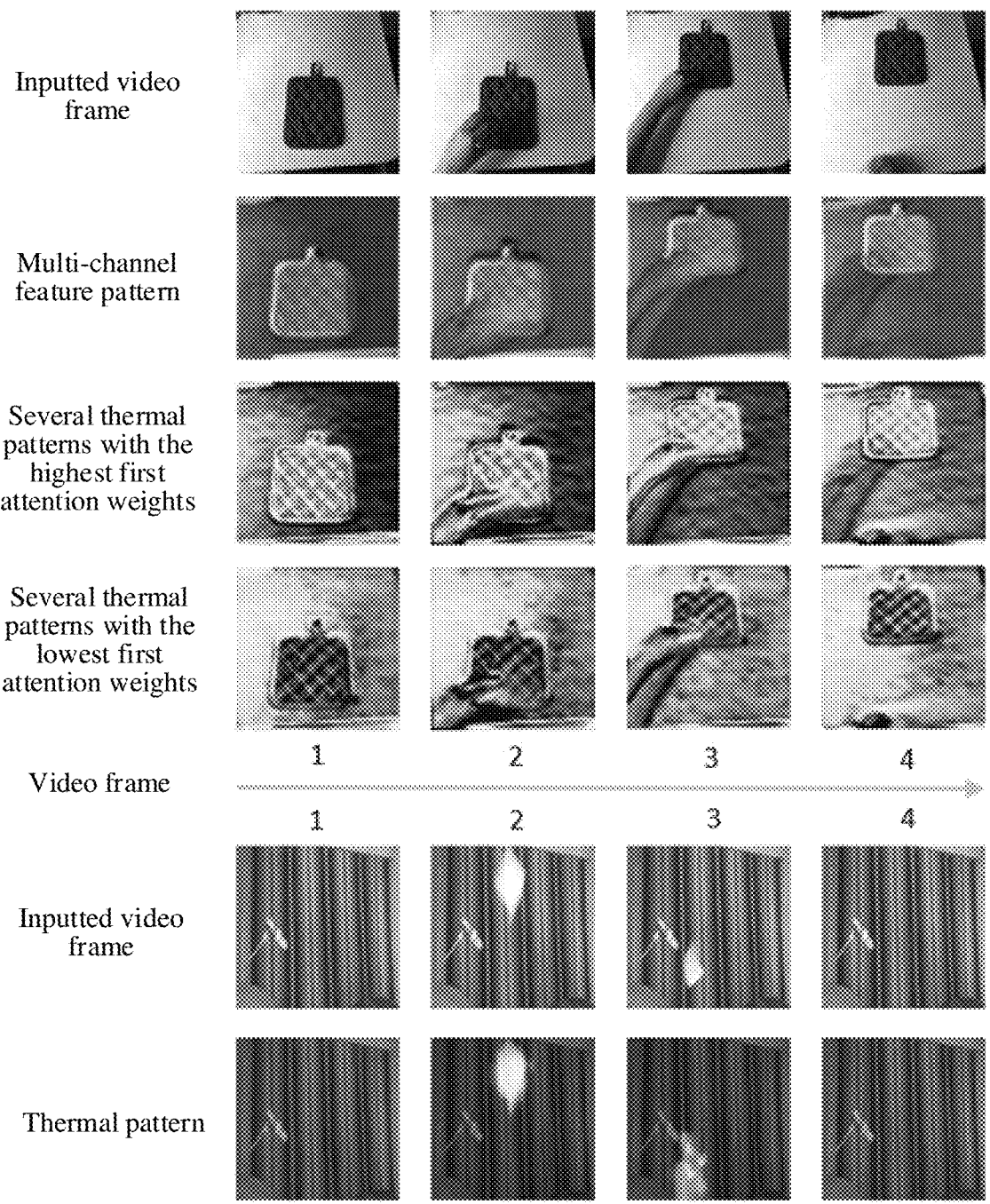
FIG. 9 is a schematic diagram of visualization of feature patterns provided by an example of the present subject matter.

During an experiment, for the CME module, the issues that need to be observed are: action-related attention information may be extracted from the multi-channel feature patterns from the front layer through the CME module to enhance part of the multi-channel feature patterns, which multi-channel feature patterns may be enhanced (endowed with larger weights) and which may be selected to be weakened (endowed with smaller weights), what information do these channels carry, whether it may be related to the action, and whether it may reflect the action attention mechanism. Therefore, the multi-channel feature patterns enhanced by the CME and the multi-channel feature patterns weakened by the CME may be visualized here. First, a multi-channel feature pattern in which a CMR-BlockB module may be inputted may be extracted, and then, the multi-channel feature patterns of each frame may be rearranged in descending order of the first attention weights generated by the CME module. The first ten and last ten multi-channel feature patterns of each frame may be selected and divided into two groups; in each group, the average values of the ten multi-channel feature patterns may be computed and compressed into one channel; and finally, this feature pattern may be used for generating a corresponding thermal pattern. Referring to FIG. 9, as shown in the first four rows of images, the third row and the fourth row respectively show thermal patterns generated by the top-10 and bottom-10 with the highest scores according to the above rules, and the first row and the second row respectively show original video frames and average images of all single-channel feature patterns of the multi-channel feature patterns. From visualization results, it may be observed that in the first 10 multi-channel feature patterns to be enhanced, selected by the CME, there may be a significantly higher attention on a region where a moving object may be located, and 10 multi-channel feature patterns to be suppressed may be more sensitive to static background regions. In other words, the CME module provided by the present subject matter may effectively distinguish the attention information, so as to enhance the multi-channel feature patterns sensitive to moving targets, and suppress the multi-channel feature patterns that tend to describe static background information.

For the SME module, the second attention weight patterns generated by the CMR-BlockB may be visualized. As shown in the last two rows in FIG. 9, the first row shows original video frames, and the second row shows the effect diagrams after superimposing the thermal patterns of the second attention weights to the original video frames. By observation, only when there may be an object of which the position or shape changes between video frames, a highlighted region will appear at the position where the object may be located, and feature values in this region will be endowed with higher weights to achieve the purpose and role of reflecting their importance.

During an experiment, datasets something-something v1 and v2 may be used for testing models with different structures, where the dataset something-something v1 includes 108499 test videos, the dataset something-something v2 includes 220847 test videos, and both the datasets something-something v1 and v2 include 174 action types. When the test videos in the datasets something-something v1 and v2 are used for testing, the video data may be preprocessed, that is, the sizes of short sides of the video frames in the test videos may be adjusted to 256, then, center cropping and scale dithering may be performed, and subsequently, the size of each video frame may be adjusted to 224×224. For the datasets something-something v1 and v2, 8 or 16 frames may be uniformly sampled from each test video in the datasets as a test set, and the test set may be inputted into different models.

TABLE 1

| Method | Basic structure of model | Number of video frames | Amount of computation | Accuracy of training set A | Accuracy of test set A | Accuracy of training set B | Accuracy of test set B |
|---|---|---|---|---|---|---|---|
| I3D | ResNet3D-50 | 32f × 2 | 306G | 41.6 | — | — | — |
| NL-I3D | | 32f × 2 | 334G | 44.4 | — | — | — |
| NL-3D + GCN | | 32f × 2 | 606G | 46.1 | 45.0 | — | — |
| ECO | BNIncep + ResNet3D-18 | 16f | 64G | 41.6 | — | — | — |
| | | 92f | 267G | 46.4 | 42.3 | — | — |
| TSM | ResNet2D-50 | 8f | 33G | 45.6 | — | 59.1 | — |
| | | 16f | 65G | 47.2 | 46.0 | 63.4 | 64.3 |
| TEI | ResNet2D-50 | 8f | 33G | 47.4 | — | 61.3 | 60.6 |
| | | 16f | 66G | 49.9 | — | 62.1 | 60.8 |
| STM | ResNet2D-50 | 8f | 33G | 49.2 | — | 62.3 | 61.3 |
| | | 16f | 65G | 50.7 | 43.1 | 64.2 | 63.5 |
| TEA | ResNet2D-50 | 8f | 35G | 48.9 | 45.3 | — | — |
| | | 16f | 70G | 51.9 | 46.6 | — | — |
| GSM | Inception V3 | 8f | 27G | 49.0 | — | — | — |
| | | 16f | 54G | 50.6 | — | — | — |
| TDRL | ResNet2D-50 | 8f | 33G | 49.8 | 42.7 | 62.6 | 61.4 |
| | | 16f | 66G | 50.9 | 44.6 | 63.8 | 62.5 |
| | | 8f × 2 | 66G | 50.4 | — | 63.5 | — |
| | | 16f × 2 | 132G | 52.0 | — | 65.0 | — |
| CMR | ResNet2D-50 | 8f | 33G | 51.3 | 43.8 | 63.7 | 62.2 |
| | | 16f | 66G | 53.2 | 47.4 | 65.7 | 64.1 |
| | | 8f × 2 | 66G | 51.9 | 44.5 | 64.6 | 63.3 |
| | | 16f × 2 | 132G | 54.3 | 48.0 | 66.1 | 64.7 |

Table 1 shows a method provided in the present subject matter and other advanced algorithms, where the full name of I3D may be Inflated 3D Conv Net, NL-I3D is a branch of I3D, the full name of NL-I3D+GCN is Inflated 3D Conv Net+Graph Convolutional Network, the full name of ECO is Efficient Convolution Operators for Tracking, the full name of TSM is Temporal Shift Module, the full name of TEI is Towards an Efficient Architecture for Video Recognition, the full name of STM is Structural Topic Model, the full name of TEA is Temporal Excitation and Aggregation for Action Recognition, the full name of GSM is Gate-Shift Networks for Video Recognition, the full name of TDRL is Temporal Distinct Representation Learning For Action Recognition, the full name of CMR is Comprehensive Motion Representation for Action Recognition, CMR is a model provided by the examples of the present subject matter, and the structure of CMR is based on ResNet-50. In addition, the full name of ResNet is Residual Network, and the value after ResNet is a model depth. Inception V3 is the third version of the founding network.

As can be seen from Table 1, compared with the ResNet2D method, that is, TDRL, under the condition of 8 frames, the technical solution (CMR) provided in the examples of the present subject matter improves the accuracy in something-something v1 by 1.5%, and improves the accuracy in something-something v2 by 1.1%; and under the condition of 16 frames, the technical solution (CMR) provided in the examples of the present subject matter improves the accuracy in something-something v1 by 2.3%, and improves the accuracy in something-something v2 by 1.9%. Compared with other methods, it can also be seen that the method (CMR) provided by the present subject matter achieves higher prediction accuracy on the premise of maintaining a similar or even less computational effort than other algorithms.

In addition, in order to verify the validity of the model, on the basis of the ResNet model, the CME module and the SME module provided by the examples of the present subject matter are inserted in different ways for testing, and results are shown in Table 2 to Table 4.

TABLE 2

| Method | Top-1 |
|---|---|
| ResNet-50 | 18.1 |
| ResNet-50 + CME and SME | 43.5 |
| ResNet-50 + TIM | 46.1 |
| ResNet-50 + TIM + CME and SME | 51.3 |

TABLE 3

| Method | Top-1 | Top-5 | Delay |
|---|---|---|---|
| Baseline + $CME_{all}$ + $SME_{all}$ | 51.0 | 79.3 | 30.4 ms |
| Baseline + $CME_{all}$ + $SME_{part}$ | 51.3 | 79.8 | 21.4 ms |
| Baseline + $CME_{part}$ + $SME_{all}$ | 51.2 | 79.2 | 26.5 ms |
| Baseline + $CME_{part}$ + $SME_{part}$ | 50.4 | 78.6 | 17.4 ms |

TABLE 4

| Method | Top-1 | Top-5 |
|---|---|---|
| ResNet-50 + TIM(Baseline) | 46.1 | 74.7 |
| Baseline + MEM | 47.4 | 76.6 |
| Baseline + PEM | 48.7 | 77.8 |
| Baseline + CME | 50.6 | 79.4 |

TABLE 4-continued

| Method | Top-1 | Top-5 |
|---|---|---|
| Baseline + SME | 50.6 | 78.9 |
| Baseline + CME and SME | 51.3 | 79.8 |

The full name of TIM is Temporal Interaction Module. The full name of MEM is Motion Enhanced Module. The full name of PEM is Progressive Enhancement Module. The TIM, the MEM and the PEM are all enhancement modules in related technologies.

Top-1 means that for a video frame, only the probability whether the result with the highest probability may be a correct result may be judged. Top-5 means that for a video frame, the probability whether the results with the first 5 probabilities include a correct result may be judged. The delay represents the time of action recognition, and the smaller the delay, the better the performance.

According to the technical solution provided by this example of the present subject matter, in a process of performing action recognition on a target video, the similarity between multiple video frames in the target video may be combined, and since the change of the action will cause the change of the similarity between the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

Figure 10:
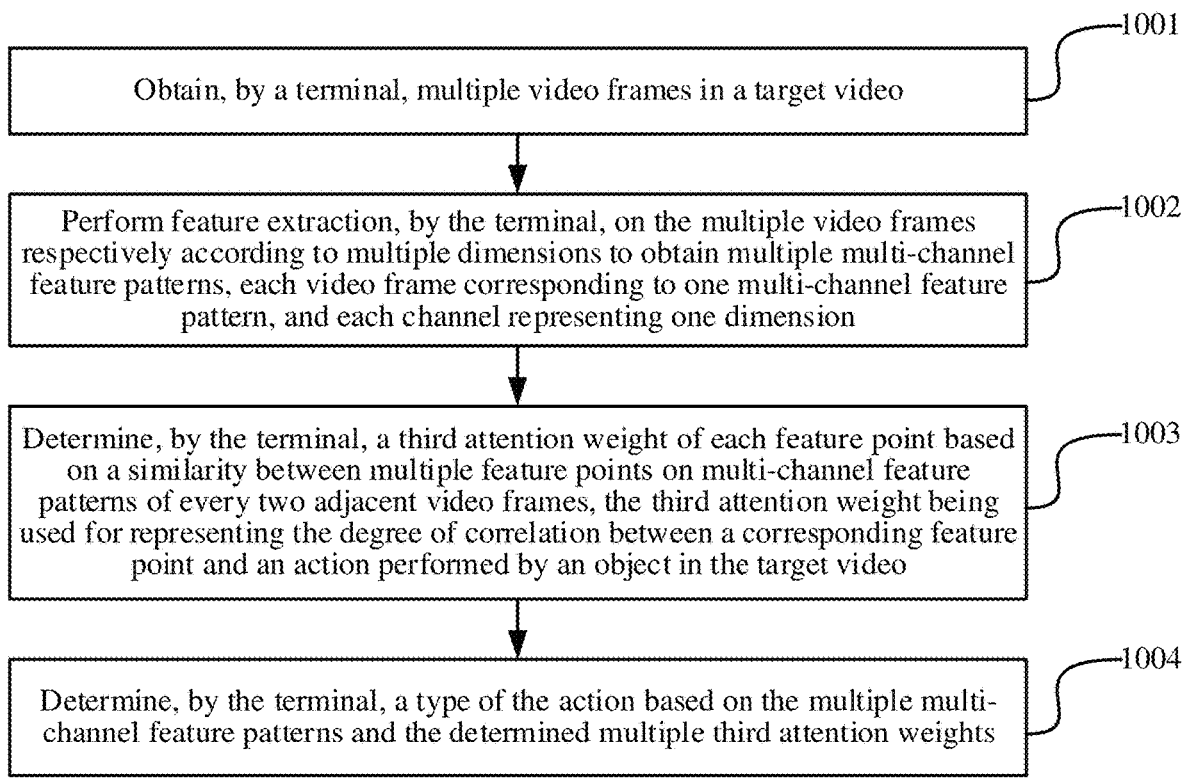
FIG. 10 is a flowchart of an action recognition method provided by another example of the present subject matter.

FIG. 10 is a flowchart of an action recognition method provided by an example of the present subject matter. Referring to FIG. 10, the method includes:

1001: Obtain, by a terminal, multiple video frames in a target video.

1002: Perform feature extraction, by the terminal, on the multiple video frames respectively according to multiple dimensions to obtain multiple multi-channel feature patterns, each video frame corresponding to one multi-channel feature pattern, and each channel representing one dimension.

1003: Determine, by the terminal, a third attention weight of each feature point based on a similarity between multiple feature points on multi-channel feature patterns of every two adjacent video frames, the third attention weight being used for representing the degree of correlation between a corresponding feature point and an action performed by an object in the target video.

If there is a moving object in the target video, the position of the object may be different in different video frames of the target video. As shown in the multi-channel feature patterns of the video frames, if a similarity between feature points at the same position on two multi-channel feature patterns may be higher, the object may not move or the magnitude of the motion may be smaller in the video frames corresponding to the two multi-channel feature patterns; and if a similarity between feature points at the same position on two multi-channel feature patterns may be lower, the object may move in the video frames corresponding to the two multi-channel feature patterns. A computer device may use the third attention weights for representing the degree of correlation between the feature points in the multi-channel feature patterns and the motion, so that in the subsequent action recognition process, the computer device may focus on the feature points with a higher degree of action correlation for recognition.

1004: Determine, by the terminal, a type of the action based on the multiple multi-channel feature patterns and the determined multiple third attention weights.

The terminal may enhance the motion-related multi-channel feature patterns based on the third attention weights, so as to improve the accuracy of action recognition.

According to the technical solution provided by this example of the present subject matter, in a process of performing action recognition on a target video, the similarity between feature points on multiple video frames in the target video may be combined, and since the change of the action will cause the change of the similarity between the feature points on the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

Figure 11:
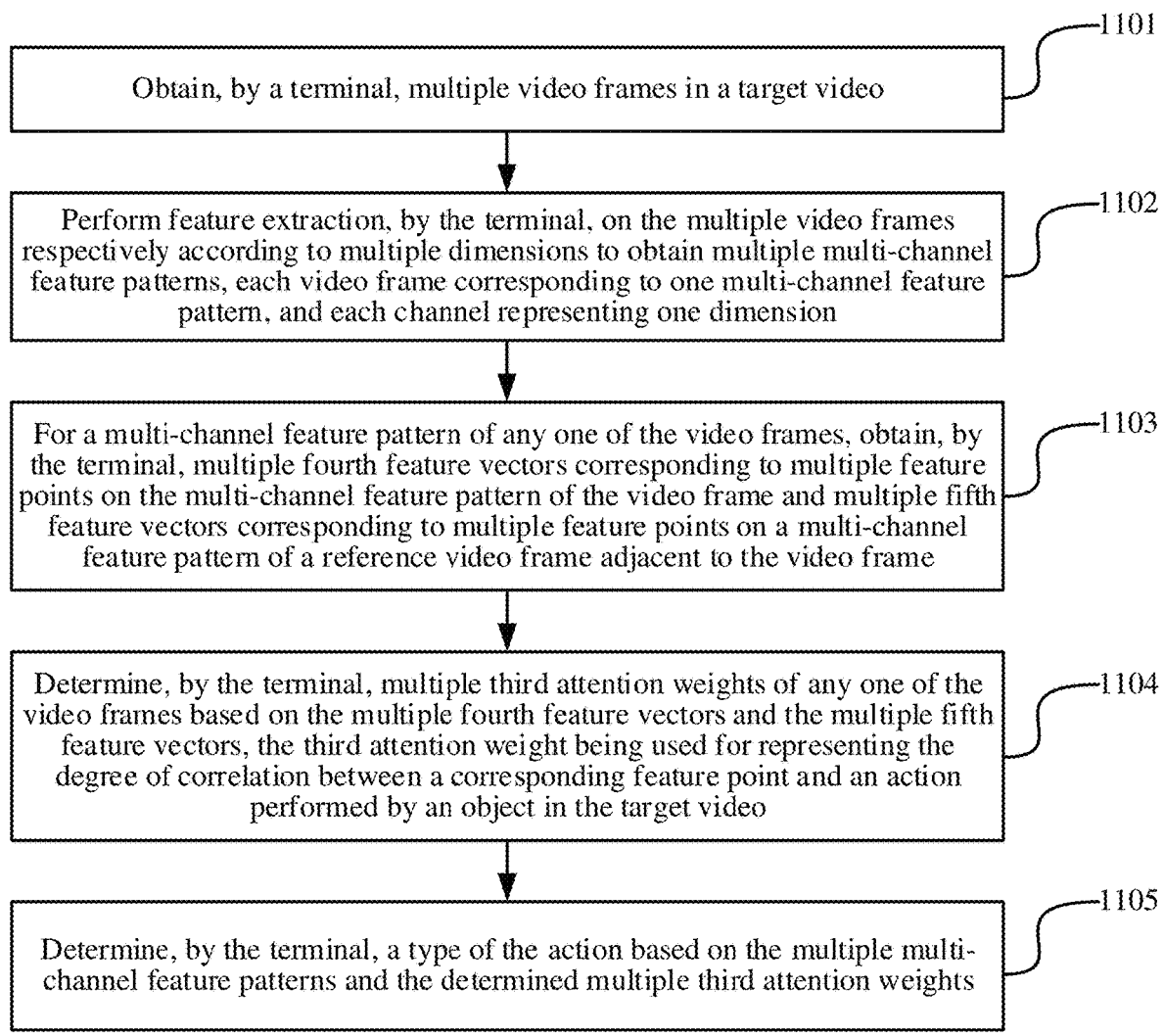
FIG. 11 is a flowchart of an action recognition method provided by another example of the present subject matter.

FIG. 11 is a flowchart of an action recognition method provided by an example of the present subject matter. Referring to FIG. 11, the method includes:

1101: Obtain, by a terminal, multiple video frames in a target video.

Step 1101 and the above step 301 belong to the same inventive concept, and an implementation process refers to the related description in step 301.

1102: Perform feature extraction, by the terminal, on the multiple video frames respectively according to multiple dimensions to obtain multiple multi-channel feature patterns, each video frame corresponding to one multi-channel feature pattern, and each channel representing one dimension.

Step 1102 and the above step 302 belong to the same inventive concept, and an implementation process refers to the related description in step 301.

1103: For a multi-channel feature pattern of any one of the video frames, obtain, by the terminal, multiple fourth feature vectors corresponding to multiple feature points on the multi-channel feature pattern of the video frame and multiple fifth feature vectors corresponding to multiple feature points on a multi-channel feature pattern of a reference video frame adjacent to the video frame.

In a possible implementation, each multi-channel feature pattern includes multiple single-channel feature patterns. Feature points at the same position on the multiple single-channel feature patterns correspond to the same pixel point on the video frame. The terminal may splice the values of the feature points at the same position on the multiple single-channel feature patterns of the multi-channel feature pattern to obtain multiple fourth feature vectors, and one fourth feature vector corresponds to one pixel point. The terminal splices the values of the feature points at the same position on the multiple single-channel feature patterns of the multi-channel feature pattern of the reference video frame to obtain multiple fifth feature vectors, and one fifth feature vector corresponds to one pixel point.

In this implementation, the terminal obtains the feature vector of each feature point from multiple single-channel feature patterns of one multi-channel feature pattern to facilitate the subsequent comparison of the differences between pixel points at the same position in different video frames, thereby obtaining action-related information, and improving the accuracy of subsequent action recognition.

1104: Determine, by the terminal, multiple third attention weights of any one of the video frames based on the multiple fourth feature vectors and the multiple fifth feature vectors, the third attention weight being used for representing the degree of correlation between a corresponding feature point and an action performed by an object in the target video.

In some examples, the third attention weight may be inversely proportional to the similarity between the fourth feature vector and the fifth feature vector; in other words, for any one of the fourth feature vectors, if a similarity between the corresponding fifth feature vector and the fourth feature vector may be higher, it means that two pixel points corresponding to the fourth feature vector and the fifth feature vector respectively do not change greatly in time sequence, and include limited action-related information; and correspondingly, during action recognition, the attention weight between the fourth feature vector and the fifth feature vector may be smaller. If a similarity between the corresponding fifth feature vector and the fourth feature vector may be lower, it means that pixel points corresponding to the fourth feature vector and the fifth feature vector respectively change greatly in time sequence, and include more action-related information; and correspondingly, during action recognition, the attention weight between the fourth feature vector and the fifth feature vector may be larger.

In a possible implementation, the terminal may obtain cosine similarities between the multiple fourth feature vectors and the corresponding multiple fifth feature vectors, so as to determine multiple third attention weights corresponding to multiple feature points on the first attention feature pattern respectively.

In this implementation, the terminal may determine the difference between pixel points at the same position on different video frames through the similarity between the fourth feature vector and the fifth feature vector, and determine the action information carried by the pixel points based on the difference, thereby improving the accuracy of subsequent action recognition.

Taking a fourth feature vector [1, 1, 2, 3, 2] and a fifth feature vector [1, 2, 3, 1, 1] corresponding to the fourth feature vector as an example, the terminal may obtain a cosine similarity 0.80 between the fourth feature vector [1, 1, 2, 3, 2] and the fifth feature vector [1, 2, 3, 1, 1]. The terminal may determine 1−0.80=0.20 as a third attention weight of the feature point corresponding to the fourth feature vector.

1105: Determine, by the terminal, a type of the action based on the multiple multi-channel feature patterns and the determined multiple third attention weights.

In a possible implementation, the terminal multiplies the multiple third attention weights by the multiple multi-channel feature patterns to obtain multiple third attention feature patterns, and each video frame corresponds to a third attention feature pattern; and recognition may be performed based on the multiple third attention feature patterns to obtain a type of the action.

For example, the terminal determines a fourth attention weight of each third attention feature pattern based on a similarity between every two third attention feature patterns, and the fourth attention weight may be used for representing the degree of correlation between a corresponding third attention feature pattern and the action; and the terminal determines a type of the action based on the multiple third attention feature patterns and the determined multiple fourth attention weights.

In an example, the fourth attention weight may be inversely proportional to the similarity between the fourth feature vector and the fifth feature vector; in other words, for any one of the fourth feature vectors, if a similarity between the corresponding fifth feature vector and the fourth feature vector may be higher, it means that two pixel points corresponding to the fourth feature vector and the fifth feature vector respectively do not change greatly in time sequence, and include limited action-related information; and correspondingly, during action recognition, the attention weight between the fourth feature vector and the fifth feature vector may be smaller. If a similarity between the corresponding fifth feature vector and the fourth feature vector may be lower, it means that pixel points corresponding to the fourth feature vector and the fifth feature vector respectively change greatly in time sequence, and include more action-related information; and correspondingly, during action recognition, the attention weight between the fourth feature vector and the fifth feature vector may be larger.

In some implementations, the terminal may obtain cosine similarities between the multiple fourth feature vectors and the corresponding multiple fifth feature vectors to determine multiple fourth attention weights corresponding to multiple feature points on the third attention feature pattern respectively, so as to determine the difference between pixel points at the same position on different video frames, and determine the action information carried by the pixel points based on the difference, thereby improving the accuracy of subsequent action recognition.

The third attention feature pattern may be a feature pattern determined based on the third attention weight, the fourth attention weight highlights the action-related information, and the terminal performs action recognition based on the third attention feature pattern and the fourth attention weight, so that a more accurate recognition effect may be obtained.

According to the technical solution provided by this example of the present subject matter, in a process of performing action recognition on a target video, the similarity between feature points on multiple video frames in the target video may be combined, and since the change of the action will cause the change of the similarity between the feature points on the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

Figure 12:
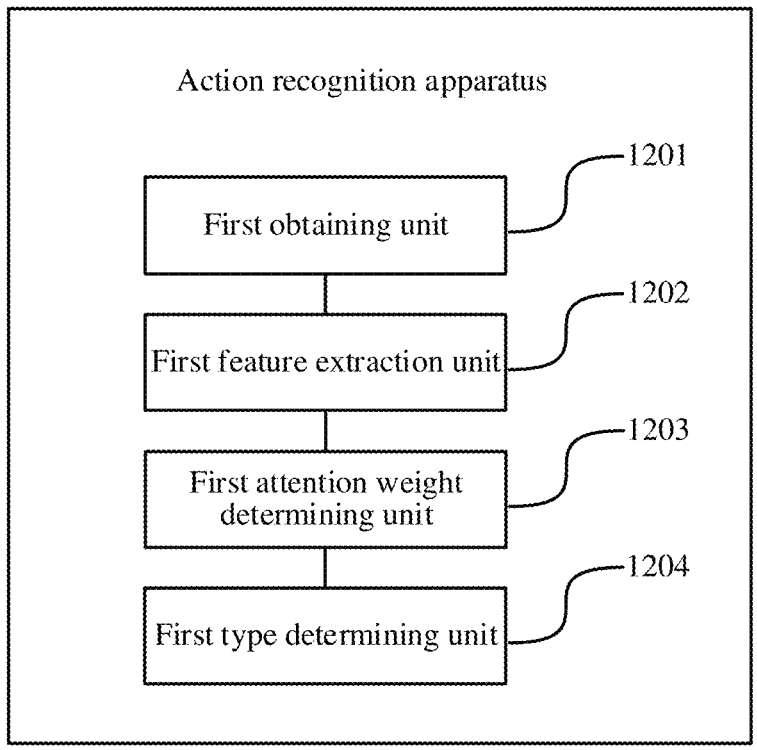
FIG. 12 is a schematic structural diagram of an action recognition apparatus provided by an example of the present subject matter.

FIG. 12 is a schematic structural diagram of an action recognition apparatus provided by an example of the present subject matter. Referring to FIG. 12, the apparatus includes: a first obtaining unit 1201, a first feature extraction unit 1202, a first attention weight determining unit 1203, and a first type determining unit 1204.

The first obtaining unit 1201 may be configured to obtain multiple video frames in a target video.

The first feature extraction unit 1202 may be configured to perform feature extraction on the multiple video frames respectively according to multiple dimensions to obtain multiple multi-channel feature patterns, each video frame corresponds to a multi-channel feature pattern, and each channel represents one dimension.

The first attention weight determining unit 1203 may be configured to determine a first attention weight of each multi-channel feature pattern based on a similarity between every two multi-channel feature patterns, and the first attention weight may be used for representing the degree of correlation between a corresponding multi-channel feature pattern and an action performed by an object in the target video.

The first type determining unit 1204 may be configured to determine a type of the action based on the multiple multi-channel feature patterns and the determined multiple first attention weights.

In a possible implementation, the first feature extraction unit may be configured to use multiple convolution kernels to perform feature extraction on any one of the video frames to obtain multiple single-channel feature patterns corresponding to the multiple convolution kernels respectively, each convolution kernel being used for extracting a feature pattern of one dimension; and splice the multiple single-channel feature patterns to obtain a multi-channel feature pattern of any one of the video frames.

In a possible implementation, the first feature extraction unit may be further configured to fill matrix edges of a matrix corresponding to any one of the video frames, and use multiple convolution kernels to perform feature extraction on the filled matrix to obtain multiple single-channel feature patterns corresponding to the multiple convolution kernels respectively.

In a possible implementation, the first feature extraction unit may be further configured to use multiple convolution kernels to perform feature extraction on a color matrix corresponding to each color channel in any one of the video frames to obtain a color feature pattern corresponding to each color matrix; and fuse three color feature patterns corresponding to any one of the video frames to obtain a single-channel feature pattern corresponding to any one of the video frames.

In a possible implementation, the first attention weight determining unit may be configured to perform dimension reduction processing on the multiple multi-channel feature patterns to obtain multiple first feature vectors, each multi-channel feature pattern corresponding to one first feature vector; and determine multiple first attention weights based on a similarity between every two first feature vectors in the multiple first feature vectors.

In a possible implementation, the first attention weight determining unit may be configured to perform dimension reduction processing on multiple single-channel feature patterns in any one of the multi-channel feature patterns respectively to obtain multiple feature values corresponding to the multiple single-channel feature patterns respectively; and combine the multiple feature values to obtain a first feature vector of any one of the multi-channel feature patterns.

In a possible implementation, the first attention weight determining unit may be configured to respectively obtain multiple similarities between any one of the first feature vectors and the multiple first feature vectors; and determine a first attention weight of any one of the first feature vectors based on the sum of products of the multiple first feature vectors and the corresponding similarities.

In a possible implementation, the first attention weight determining unit may be configured to perform normalization processing on the sum of products of the multiple first feature vectors and the corresponding similarities to obtain a first attention weight of any one of the first feature vectors.

In a possible implementation, the first type determining unit may be configured to multiply the multiple first attention weights by the multiple multi-channel feature patterns to obtain multiple first attention feature patterns, each video frame corresponding to one first attention feature pattern; and perform recognition based on the multiple first attention feature patterns to obtain a type of the action.

In a possible implementation, the first type determining unit may be configured to obtain multiple second feature vectors corresponding to multiple feature points on any one of the first attention feature patterns and multiple third feature vectors corresponding to multiple feature points on a reference attention feature pattern of any one of the first attention feature patterns, the video frame corresponding to the reference attention feature pattern being a video frame adjacent to the video frame corresponding to any one of the first attention feature patterns; determine multiple second attention weights corresponding to multiple feature points on any one of the first attention feature patterns respectively based on similarities between the multiple second feature vectors and the multiple third feature vectors, the second attention weight being used for representing the degree of correlation between a corresponding feature point and the action; multiply the multiple second attention weights by multiple feature points on any one of the first attention feature patterns to obtain a second attention feature pattern of any one of the first attention feature patterns; and perform recognition based on the multiple second attention feature patterns to obtain a type of the action.

When the action recognition apparatus provided in the foregoing examples recognizes an action, the division of the foregoing functional modules may be merely an example for description. In the practical application, the functions may be assigned to and completed by different functional modules according to the requirements, that is, the internal structure of the computer device may be divided into different functional modules, to implement all or some of the functions described above. In addition, the action recognition apparatus and the action recognition method examples provided in the foregoing examples belong to the same concept. For the specific implementation process, reference may be made to the method examples.

According to the technical solution provided by this example of the present subject matter, in a process of performing action recognition on a target video, the similarity between multiple video frames in the target video may be combined, and since the change of the action will cause the change of the similarity between the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

Figure 13:
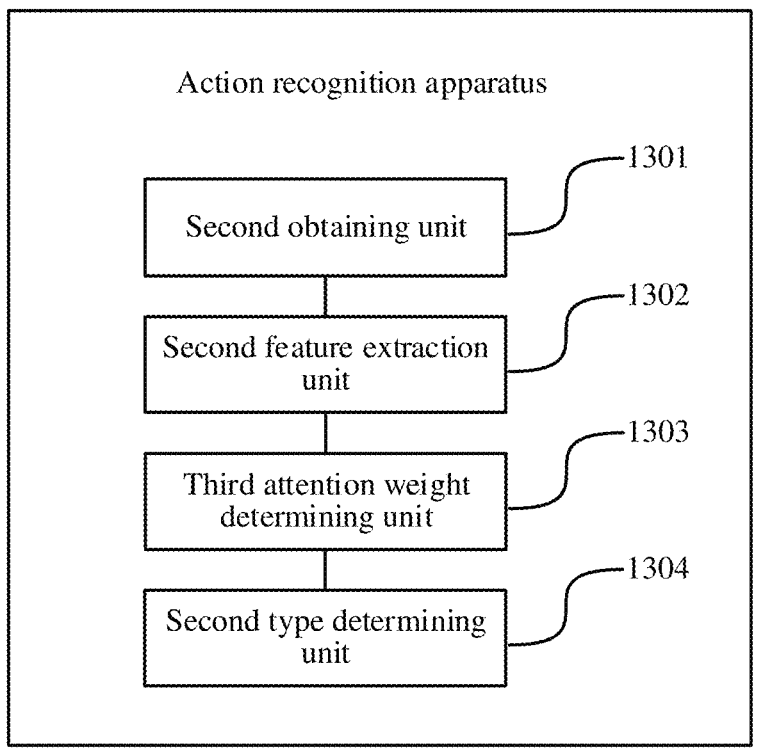
FIG. 13 is a schematic structural diagram of an action recognition apparatus provided by another example of the present subject matter.

FIG. 13 is a schematic structural diagram of an action recognition apparatus provided by an example of the present subject matter. Referring to FIG. 13, the apparatus includes: a second obtaining unit 1301, a second feature extraction unit 1302, a third attention weight determining unit 1303, and a second type determining unit 1304.

The second obtaining unit 1301 may be configured to obtain multiple video frames in a target video.

The second feature extraction unit 1302 may be configured to perform feature extraction on the multiple video frames respectively according to multiple dimensions to obtain multiple multi-channel feature patterns, each video frame corresponds to a multi-channel feature pattern, and each channel represents one dimension.

The third attention weight determining unit 1303 may be configured to determine a third attention weight of each feature point based on a similarity between multiple feature points on multi-channel feature patterns of every two adjacent video frames, and the third attention weight may be used for representing the degree of correlation between a corresponding feature point and an action performed by an object in the target video.

The second type determining unit 1304 may be configured to determine a type of the action based on the multiple multi-channel feature patterns and the determined multiple third attention weights.

In a possible implementation, the third attention weight determining unit may be configured to obtain multiple fourth feature vectors corresponding to multiple feature points on a multi-channel feature pattern of any one of the video frames and multiple fifth feature vectors corresponding to multiple feature points on a multi-channel feature pattern of a reference video frame adjacent to any one of the video frames; and determine multiple third attention weights of any one of the video frames based on the multiple fourth feature vectors and the multiple fifth feature vectors.

In a possible implementation, the second type determining unit may be configured to multiply the multiple third attention weights by the multiple multi-channel feature patterns to obtain multiple third attention feature patterns, each video frame corresponding to one third attention feature pattern; and perform recognition based on the multiple third attention feature patterns to obtain a type of the action.

In a possible implementation, the second type determining unit may be further configured to determine a fourth attention weight of each third attention feature pattern based on a similarity between every two third attention feature patterns, the fourth attention weight being used for representing the degree of correlation between a corresponding third attention feature pattern and the action; and determine a type of the action based on the multiple third attention feature patterns and the determined multiple fourth attention weights.

In a possible implementation, the second type determining unit may be configured to determine a fourth attention weight of each third attention feature pattern based on a similarity between every two third attention feature patterns, the fourth attention weight being used for representing the degree of correlation between a corresponding third attention feature pattern and the action; and determine a type of the action based on the multiple third attention feature patterns and the determined multiple fourth attention weights.

When the action recognition apparatus provided in the foregoing examples recognizes an action, the division of the foregoing functional modules may be merely an example for description. In the practical application, the functions may be assigned to and completed by different functional modules according to the requirements, that is, the internal structure of the computer device may be divided into different functional modules, to implement all or some of the functions described above. In addition, the action recognition apparatus and the action recognition method examples provided in the foregoing examples belong to the same concept. For the specific implementation process, reference may be made to the method examples.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module may be implemented using one or more processors (or processors and memory). Likewise, a processor (or processors and memory) may be used to implement one or more modules. Moreover, each module may be part of an overall module that includes the functionalities of the module.

According to the technical solution provided by this example of the present subject matter, in a process of performing action recognition on a target video, the similarity between feature points on multiple video frames in the target video may be combined, and since the change of the action will cause the change of the similarity between the feature points on the video frames, the similarity may reflect the continuity of the action. The attention weights obtained based on the similarity may represent the degree of correlation between the feature patterns and the action, and action recognition may be performed based on the attention weights and multi-channel feature patterns of video frames, so that the accuracy of action recognition may be improved.

An example of the present subject matter provides a computer device. The computer device may be implemented as a terminal or a server, and a structure of the terminal may be first described below.

Figure 14:
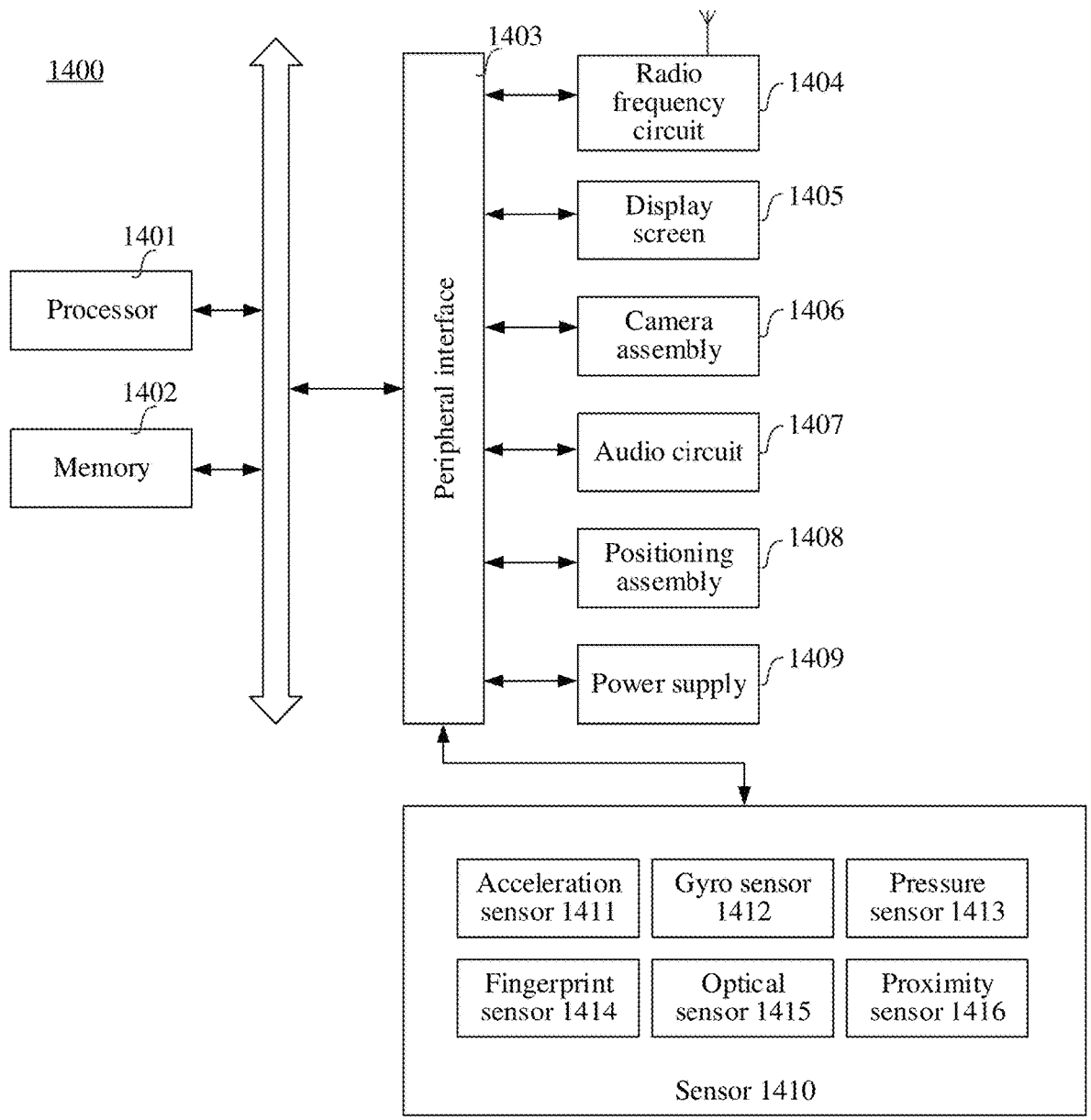
FIG. 14 is a schematic structural diagram of a terminal provided by an example of the present subject matter.

FIG. 14 is a schematic structural diagram of a terminal provided by an example of the present subject matter. The terminal 1400 may be a smartphone, a tablet computer, a notebook computer, a desktop computer, or the like, but may not be limited thereto.

Generally, the terminal 1400 includes: one or more processors 1401 and one or more memories 1402.

The processor 1401 may include one or more processing cores, for example, a 4-core processor or an 8-core processor. The processor 1401 may be implemented in at least one hardware form of a digital signal processor (DSP), a field-programmable gate array (FPGA), and a programmable logic array (PLA). The processor 1401 may alternatively include a main processor and a coprocessor. The main processor may be configured to process data in an active state, also referred to as a central processing unit (CPU). The coprocessor may be a low-power processor configured to process data in a standby state. In some examples, a graphics processing unit (GPU) may be integrated into the processor 1401. The GPU may be configured to be responsible for rendering and drawing content to be displayed on a display screen. In some examples, the processor 1401 may further include an artificial intelligence (AI) processor. The AI processor may be configured to process computing operations related to machine learning.

The memory 1402 may include one or more computer-readable storage media. The computer-readable storage media may be non-transient. The memory 1402 may further include a high-speed random access memory and a non-volatile memory, for example, one or more disk storage devices or flash storage devices. In some examples, the non-transitory computer-readable storage medium in the memory 1402 may be configured to store at least one computer-readable instruction, and the at least one computer-readable instruction may be configured to be executed by the processor 1401 to implement the action recognition method provided in the method examples of the present subject matter.

In some examples, the terminal 1400 may optionally include a peripheral device interface 1403 and at least one peripheral device. The processor 1401, the memory 1402, and the peripheral device interface 1403 may be connected through a bus or a signal line. Each peripheral device may be connected to the peripheral device interface 1403 through a bus, a signal cable, or a circuit board. Specifically, the peripheral device includes: at least one of a radio frequency circuit 1404, a display screen 1405, a camera assembly 1406, an audio circuit 1407, a positioning assembly 1408, and a power supply 1409.

The peripheral device interface 1403 may be configured to connect at least one peripheral device related to input/output (I/O) to the processor 1401 and the memory 1402.

The RF circuit 1404 may be configured to receive and transmit an RF signal, also referred to as an electromagnetic signal. The RF circuit 1404 communicates with a communication network and other communication devices by using the electromagnetic signal.

The display screen 1405 may be configured to display a user interface (UI). The UI may include a graph, a text, an icon, a video, and any combination thereof. The camera component 1406 may be configured to capture an image or a video. The positioning component 1408 may be configured to position a current geographic location of the terminal 1400, to implement navigation or a location based service (LBS). The power supply 1409 may be configured to supply power to components in the terminal 1400.

In some examples, the terminal 1400 further includes one or more sensors 1410. The one or more sensors 1410 include but may not be limited to an acceleration sensor 1411, a gyro sensor 1412, a pressure sensor 1413, a fingerprint sensor 1414, an optical sensor 1415, and a proximity sensor 1416.

A person skilled in the art may understand that the structure shown in FIG. 14 constitutes no limitation on the terminal 1400, and the terminal may include more or fewer components than those shown in the figure, or some components may be combined, or a different component deployment may be used.

Figure 15:
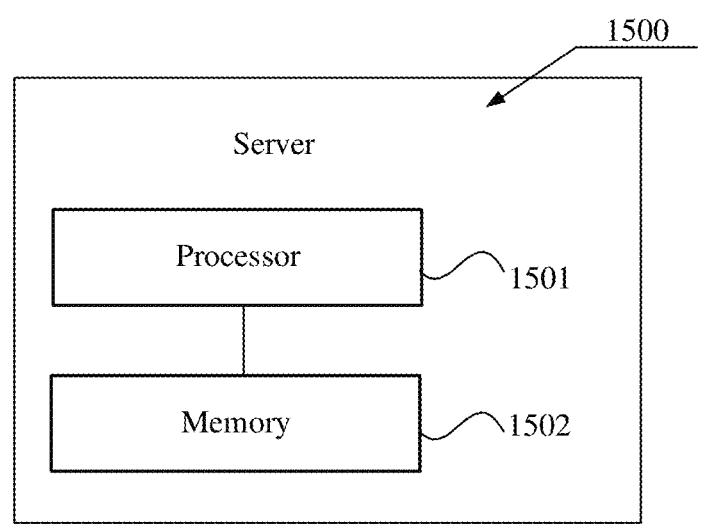
FIG. 15 is a schematic structural diagram of a server provided by an example of the present subject matter.

The above computer device may further be implemented as a server, and the structure of the server may be introduced below:

FIG. 15 is a schematic structural diagram of a server according to an example of the present subject matter. The server 1500 may vary greatly because a configuration or performance varies, and may include one or more central processing units (CPU) 1501 and one or more memories 1502. The one or more memories 1502 store at least one computer-readable instruction, and the at least one computer-readable instruction may be loaded and executed by the one or more processors 1501 to implement the methods provided in the foregoing various method examples. Certainly, the server 1500 may further include components such as a wired or wireless network interface, a keyboard, and an input/output interface, to facilitate inputs/outputs. The server 1500 may further include another component configured to implement functions of a device.

In an example, a non-transitory computer-readable storage medium, such as a memory including a computer-readable instruction, may be further provided, and the computer-readable instruction may be executed by a processor to complete the action recognition method in the foregoing examples. For example, the computer-readable storage medium may be a read-only memory (ROM), a RAM, a compact disc ROM (CD-ROM), a magnetic tape, a floppy disk, an optical data storage device, or the like.

In an example, a computer-readable instruction product or a computer-readable instruction may be further provided, including program code, the program code being stored in a non-transitory computer-readable storage medium. A processor of a computer device reads the program code from the non-transitory computer-readable storage medium, and the processor executes the program code, to cause the computer device to perform the action recognition method.

A person of ordinary skill in the art may understand that all or some of the steps of the foregoing examples may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are merely optional examples of the present subject matter, but may not be intended to limit the present subject matter. Any modification, equivalent replacement, or improvement made within the spirit and principle of the present subject matter shall fall within the protection scope of the present subject matter.

What is claimed is:

1. An action recognition method performed by a computer device, comprising:
    obtaining multiple video frames in a target video;
    performing feature extraction on the multiple video frames respectively according to multiple dimensions to obtain multiple multi-channel feature patterns, each video frame corresponding to one multi-channel feature pattern, and each channel representing one dimension;
    determining an attention weight of each multi-channel feature pattern based on a similarity between every two multi-channel feature patterns in the multiple multi-channel feature patterns comprising the each multi-channel feature pattern and another multi-channel feature pattern, the attention weight being used for representing a degree of correlation between a corresponding multi-channel feature pattern and an action performed by an object in the target video, the similarity between a multi-channel feature pattern pair being used for representing a magnitude of a motion performed by the object in the multiple video frames corresponding to the multi-channel feature pattern pair; and
    determining a type of the action based on the multiple multi-channel feature patterns and the determined multiple attention weights.

2. The method according to claim 1, wherein the performing comprises:
    using multiple convolution kernels to perform feature extraction on one of the video frames to obtain multiple single-channel feature patterns corresponding to the multiple convolution kernels respectively, each convolution kernel being used for extracting a feature pattern of one dimension; and
    splicing the multiple single-channel feature patterns to obtain a multi-channel feature pattern of one of the video frames.

3. The method according to claim 2, wherein using multiple convolution kernels to perform feature extraction on the one of the video frames to obtain multiple single-channel feature patterns corresponding to the multiple convolution kernels respectively comprises:
    filling matrix edges of a matrix corresponding to one of the video frames, and using multiple convolution kernels to perform feature extraction on the filled matrix to obtain multiple single-channel feature patterns corresponding to the multiple convolution kernels respectively.

4. The method according to claim 2, wherein the method further comprises:
    the video frame comprises three color (RGB) channels, and using multiple convolution kernels to perform feature extraction on the one of the video frames to obtain multiple single-channel feature patterns corresponding to the multiple convolution kernels respectively comprises:
        using multiple convolution kernels to perform feature extraction on a color matrix corresponding to each color channel in one of the video frames to obtain a color feature pattern corresponding to each color matrix; and
        fusing three color feature patterns corresponding to one of the video frames to obtain a single-channel feature pattern corresponding to one of the video frames.

5. The method according to claim 1, wherein determining an attention weight of each multi-channel feature pattern based on a similarity between every two multi-channel feature patterns in the multiple multi-channel feature patterns comprises:
    performing dimension reduction processing on the multiple multi-channel feature patterns to obtain multiple feature vectors, each multi-channel feature pattern corresponding to one feature vector; and
    determining an attention weight of each feature vector based on a similarity between every two feature vectors in the multiple feature vectors.

6. The method according to claim 5, wherein performing dimension reduction processing on the multiple multi-channel feature patterns to obtain multiple feature vectors comprises:
    performing dimension reduction processing on multiple single-channel feature patterns in one of the multi-channel feature patterns respectively to obtain multiple feature values corresponding to the multiple single-channel feature patterns respectively; and
    combining the multiple feature values to obtain a feature vector of one of the multi-channel feature patterns.

7. The method according to claim 5, wherein determining an attention weight of each feature vector based on a similarity between every two feature vectors in the multiple feature vectors comprises:
    respectively obtaining multiple similarities between one of the feature vectors and the multiple feature vectors; and
    determining an attention weight of one of the feature vectors based on a sum of products of the multiple feature vectors and the corresponding similarities.

8. The method according to claim 7, wherein determining an attention weight of the one of the feature vectors based on the sum of products of the multiple feature vectors and the corresponding similarities comprises:
    performing normalization processing on the sum of products of the multiple feature vectors and the corresponding similarities to obtain an attention weight of one of the feature vectors.

9. The method according to claim 1, wherein determining a type of the action based on the multiple multi-channel feature patterns and the determined multiple attention weights comprises:
    multiplying the multiple attention weights by the multiple multi-channel feature patterns to obtain multiple attention feature patterns, each video frame corresponding to one attention feature pattern; and
    performing recognition based on the multiple attention feature patterns to obtain a type of the action.

10. The method according to claim 9, wherein
    the multiple attention weights are first multiple attention weights, the multiple attention feature patterns are first multiple attention feature patterns, and the performing recognition based on the multiple attention feature patterns to obtain a type of the action comprises:

obtaining multiple first feature vectors corresponding to multiple feature points on one of the attention feature patterns and multiple second feature vectors corresponding to multiple feature points on a reference attention feature pattern of one of the attention feature patterns, the video frame corresponding to the reference attention feature pattern being a video frame adjacent to the video frame corresponding to one of the attention feature patterns;

determining multiple second attention weights corresponding to multiple feature points on one of the attention feature patterns respectively based on similarities between the multiple first feature vectors and the multiple second feature vectors, the second attention weight being used for representing the degree of correlation between a corresponding feature point and the action;

multiplying the multiple second attention weights by multiple feature points on one of the attention feature patterns to obtain a second attention feature pattern of one of the attention feature patterns; and performing recognition based on the multiple second attention feature patterns to obtain a type of the action.

11. The method according to claim 1, wherein obtaining multiple video frames in a target video comprises:

performing interval sampling on a target video to obtain multiple video frames in the target video.

12. A computer device, comprising:

one or more processors; and a memory in communication with the one or more processors, the memory storing computer-readable instructions executable by the one or more processors to configure the computer device to perform the method of claim 1.

13. A non-transitory computer-readable storage medium comprising computer-readable instructions operable, when execute by one or more computing systems, to cause the one or more computing systems to perform the method of claim 1.

14. An action recognition method performed by a computer device, comprising:

obtaining multiple video frames in a target video;

performing feature extraction on the multiple video frames respectively according to multiple dimensions to obtain multiple multi-channel feature patterns, each video frame corresponding to one multi-channel feature pattern, and each channel representing one dimension;

determining an attention weight of each feature point based on a similarity between multiple feature points on multi-channel feature patterns of every two adjacent video frames comprising the each feature point on a multi-channel feature pattern of a video frame and another feature point at the same position on an another multi-channel feature pattern of another video frame adjacent to the video frame, the attention weight being used for representing a degree of correlation between a corresponding feature point and an action performed by an object in the target video, the similarity between multiple feature points on multi-channel feature patterns of a two adjacent video frame pair being used for representing a magnitude of a motion performed by the object in the multiple video frames corresponding to multi-channel feature patterns of the two adjacent video frame pair; and determining a type of the action based on the multiple multi-channel feature patterns and the determined multiple attention weights.

15. The method according to claim 14, wherein the multiple attention weights are multiple first attention weights, and the determining an attention weight of each feature point based on a similarity between multiple feature points on multi-channel feature patterns of every two adjacent video frames comprises:

obtaining multiple first feature vectors corresponding to multiple feature points on a multi-channel feature pattern of one of the video frames and multiple second feature vectors corresponding to multiple feature points on a multi-channel feature pattern of a reference video frame adjacent to one of the video frames; and determining multiple second attention weights of one of the video frames based on the multiple first feature vectors and the multiple second feature vectors.

16. The method according to claim 14, wherein determining a type of the action based on the multiple multi-channel feature patterns and the determined multiple attention weights comprises:

multiplying the multiple attention weights by the multiple multi-channel feature patterns to obtain multiple attention feature patterns, each video frame corresponding to one attention feature pattern; and performing recognition based on the multiple attention feature patterns to obtain a type of the action.

17. The method according to claim 16, wherein performing recognition based on the multiple attention feature patterns to obtain a type of the action comprises:

determining a second attention weight of each attention feature pattern based on a similarity between every two attention feature patterns, the second attention weight being used for representing the degree of correlation between a corresponding attention feature pattern and the action; and determining a type of the action based on the multiple attention feature patterns and the determined multiple second attention weights.

18. A non-transitory computer readable medium storing a plurality of instructions, wherein the plurality of instructions, when executed by a processor, configure the processor to:

obtain multiple video frames in a target video;

perform feature extraction on the multiple video frames respectively according to multiple dimensions to obtain multiple multi-channel feature patterns, each video frame corresponding to one multi-channel feature pattern, and each channel representing one dimension;

determine an attention weight of each multi-channel feature pattern based on a similarity between every two multi-channel feature patterns in the multiple multi-channel feature patterns comprising the each multi-channel feature pattern and another multi-channel feature pattern, the attention weight being used for representing a degree of correlation between a corresponding multi-channel feature pattern and an action performed by an object in the target video, the similarity between a multi-channel feature pattern pair being used for representing a magnitude of a motion performed by the object in the multiple video frames corresponding to the multi-channel feature pattern pair; and determine a type of the action based on the multiple multi-channel feature patterns and the determined multiple attention weights.

19. A non-transitory computer readable medium storing a plurality of instructions, wherein the plurality of instructions, when executed by a processor, configure the processor to:

obtain multiple video frames in a target video;

perform feature extraction on the multiple video frames respectively according to multiple dimensions to obtain multiple multi-channel feature patterns, each video frame corresponding to one multi-channel feature pattern, and each channel representing one dimension;

determine an attention weight of each feature point based on a similarity between multiple feature points on multi-channel feature patterns of every two adjacent video frames comprising the each feature point on a multi-channel feature pattern of a video frame and another feature point at the same position on an another multi-channel feature pattern of another video frame adjacent to the video frame, the attention weight being used for representing a degree of correlation between a corresponding feature point and an action performed by an object in the target video, the similarity between multiple feature points on multi-channel feature patterns of a two adjacent video frame pair being used for representing a magnitude of a motion performed by the object in the multiple video frames corresponding to multi-channel feature patterns of the two adjacent video frame pair; and determine a type of the action based on the multiple multi-channel feature patterns and the determined multiple attention weights.

\* \* \* \* \*